United States Patent
Chih et al.

(10) Patent No.: US 12,277,198 B2
(45) Date of Patent: Apr. 15, 2025

(54) INFORMATION PROCESSING DEVICE, INFORMATION PROCESSING METHOD, AND INFORMATION PROCESSING SYSTEM

(71) Applicant: FELICA NETWORKS, INC., Tokyo (JP)

(72) Inventors: Mark Hsinhsien Chih, Tokyo (JP); Kenichi Motodate, Tokyo (JP); Atsuo Kurokawa, Tokyo (JP); Masashi Miyagi, Tokyo (JP); Erika Kumakura, Tokyo (JP); Yohei Ichikawa, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 147 days.

(21) Appl. No.: 17/906,591

(22) PCT Filed: Mar. 18, 2021

(86) PCT No.: PCT/JP2021/010988
§ 371 (c)(1),
(2) Date: Sep. 16, 2022

(87) PCT Pub. No.: WO2021/200192
PCT Pub. Date: Oct. 7, 2021

(65) Prior Publication Data
US 2023/0161849 A1    May 25, 2023

(30) Foreign Application Priority Data
Mar. 31, 2020    (JP) ................................ 2020-063533

(51) Int. Cl.
*G06F 21/12*    (2013.01)
*G06F 8/61*    (2018.01)
(Continued)

(52) U.S. Cl.
CPC ................ *G06F 21/12* (2013.01); *G06F 8/62* (2013.01); *G06F 21/554* (2013.01); *G06F 21/71* (2013.01);
(Continued)

(58) Field of Classification Search
CPC .......... G06F 21/12; G06F 8/62; G06F 21/554; G06F 21/71; G06F 21/1011;
(Continued)

(56) References Cited

U.S. PATENT DOCUMENTS

| 2003/0105889 A1* | 6/2003 | Shi ...................... G06F 9/44536 |
| | | 719/331 |
| 2019/0370778 A1* | 12/2019 | Lerch .................... H04L 63/102 |
| 2020/0151365 A1* | 5/2020 | Phan ....................... G06F 21/71 |

FOREIGN PATENT DOCUMENTS

| JP | 08-328915 A | 12/1996 |
| JP | 2003-501973 A | 1/2003 |

(Continued)

OTHER PUBLICATIONS

International Search Report and Written Opinion of PCT Application No. PCT/JP2021/010988, issued on May 25, 2021, 11 pages of ISRWO.

*Primary Examiner* — Cheng-Feng Huang
(74) *Attorney, Agent, or Firm* — CHIP LAW GROUP

(57) ABSTRACT

The present disclosure relates to an information processing device, an information processing method, a program, and an information processing system each capable of achieving flexible use of a storage region of a secure element. When a trigger is acquired by an external trigger device from the outside, an applet is installed or deleted into and from the secure element according to the type of the acquired trigger.

(Continued)

The information processing device and the like of the present disclosure are applicable to an electronic apparatus including a secure element.

18 Claims, 23 Drawing Sheets

(51) Int. Cl.
*G06F 21/55* (2013.01)
*G06F 21/71* (2013.01)
*G06F 21/10* (2013.01)
*G06Q 50/40* (2024.01)

(52) U.S. Cl.
CPC .... *G06F 21/1011* (2023.08); *G06F 2221/034* (2013.01); *G06Q 50/40* (2024.01)

(58) Field of Classification Search
CPC ..... G06F 2221/034; G06F 8/61; G06Q 50/40; G06Q 50/10; G06Q 20/42
See application file for complete search history.

(56) References Cited

FOREIGN PATENT DOCUMENTS

| | | |
|---|---|---|
| JP | 2003-280992 A | 10/2003 |
| JP | 2005-011469 A | 1/2005 |
| JP | 2014-142935 A | 8/2014 |
| JP | 2015-207273 A | 11/2015 |
| JP | 2015-211379 A | 11/2015 |
| JP | 2017527844 A | 9/2017 |
| JP | 2018-500685 A | 1/2018 |
| JP | 2019087922 A | 6/2019 |

\* cited by examiner

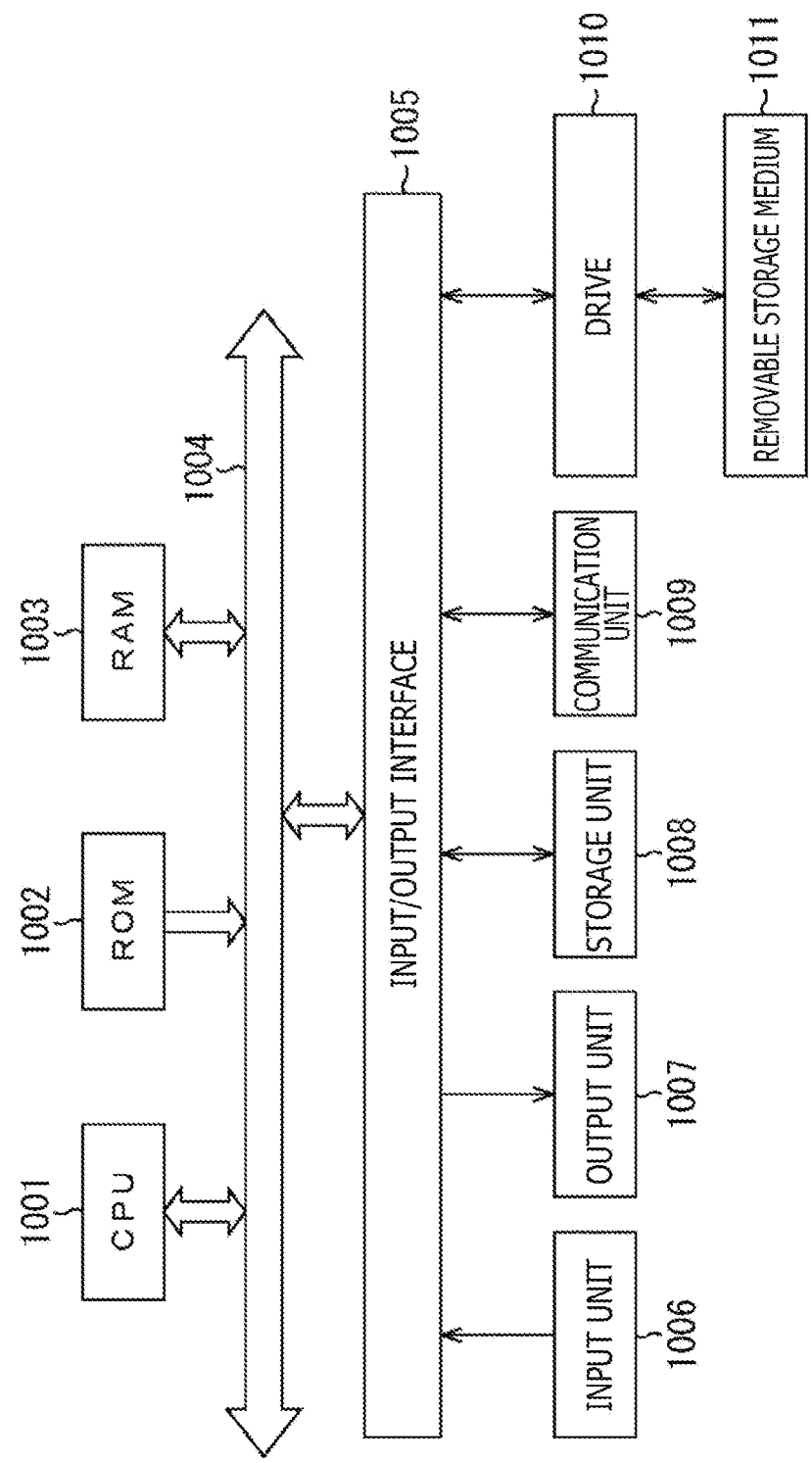

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2021/010988 filed on Mar. 18, 2021, which claims priority benefit of Japanese Patent Application No. JP 2020-063533 filed in the Japan Patent Office on Mar. 31, 2020. Each of the above-referenced applications is hereby incorporated herein by reference in its entirety.

TECHNICAL FIELD

The present disclosure relates to an information processing device, an information processing method, a program, and an information processing system, and particularly to an information processing device, an information processing method, a program, and an information processing system each capable of achieving flexible use of a storage region of a secure element.

BACKGROUND ART

An applet which is integrated into an application program available for a user and is executed contains secure information necessary for executing the application program, such as an ID, a key, and a log, and is generally incorporated in an OS such as Java (registered trademark) Card OS within a secure element.

However, there is an upper limit to a capacity available for an applet storage region in the secure element in view of cost of the secure element (chip), or of a smartphone or the like incorporating the secure element.

With an increase in the number of secure application programs each using the applet in the secure element, such as settlements, transportation electronic passes (transportation tickets), and user authentication, a user himself or herself is required to manage the number of applets each using the limited applet storage region.

In this case, the user is required to delete or add the applets as necessary.

Accordingly, conventionally proposed has been such a technology which automatically deletes a registered applet using a deletion time and date or a deletion time registered beforehand or a deletion count value from registered timing on the basis of a desired period of use of the registered applet (see PTL 1 and PTL 2).

Moreover, developed has been such a technology which automatically deletes a registered applet in accordance with a change of position information (see PTL 3).

CITATION LIST

Patent Literature

[PTL 1]
Japanese Patent Laid-open No. 2005-11469
[PTL 2]
Japanese Patent Laid-open No. Hei 8-328915
[PTL 3]
Japanese Patent Laid-open No. 2003-280992

SUMMARY

Technical Problem

However, in each of PTL 1 to 3, condition settings provided by a user as settings for deleting applets registered in a storage region are only uniform settings (Single Triggers) such as a registration period and position information.

In this case, the applets are difficult to delete or re-add in accordance with daily behaviors or the like of the user. Accordingly, flexible use of the storage region of the secure element cannot be achieved.

The present disclosure has been developed in consideration of the abovementioned circumstances, and particularly achieves flexible use of a storage region of a secure element by allowing deletion or re-addition of an applet registered in the storage region of the secure element in accordance with a behavior or the like of the user.

Solution to Problem

An information processing device, a program, and an information processing system according to one aspect of the present disclosure are directed to an information processing device, a program, and an information processing system, respectively, each including a trigger acquisition unit that acquires a trigger, and a management unit that manages an applet in a secure element on the basis of the trigger.

An information processing method according to one aspect of the present disclosure is directed to an information processing method including steps of acquiring a trigger, and managing an applet in a secure element on the basis of the trigger.

According to the one aspect of the present disclosure, a trigger is acquired, and an applet in a secure element is managed on the basis of the trigger.

BRIEF DESCRIPTION OF DRAWINGS

FIG. 23 is a diagram explaining a configuration example of a general-purpose personal computer.

DESCRIPTION OF EMBODIMENT

A preferred embodiment of the present disclosure will be hereinafter described in detail with reference to the accompanying drawings. Note that constituent elements having substantially identical functional configurations in the present description and the drawings are given identical reference signs to omit repetitive explanation.

A mode for carrying out the present technology will be hereinafter described. The description will be presented in the following order.

1. Preferred embodiment
2. Modifications
3. Example of execution by software

1. Preferred Embodiment

Configuration Example of Information Processing System of Present Disclosure

The present disclosure particularly achieves flexible use of a storage region of a secure element by allowing deletion or re-addition of an applet registered in the storage region of the secure element in accordance with a behavior of a user.

Figure 1:
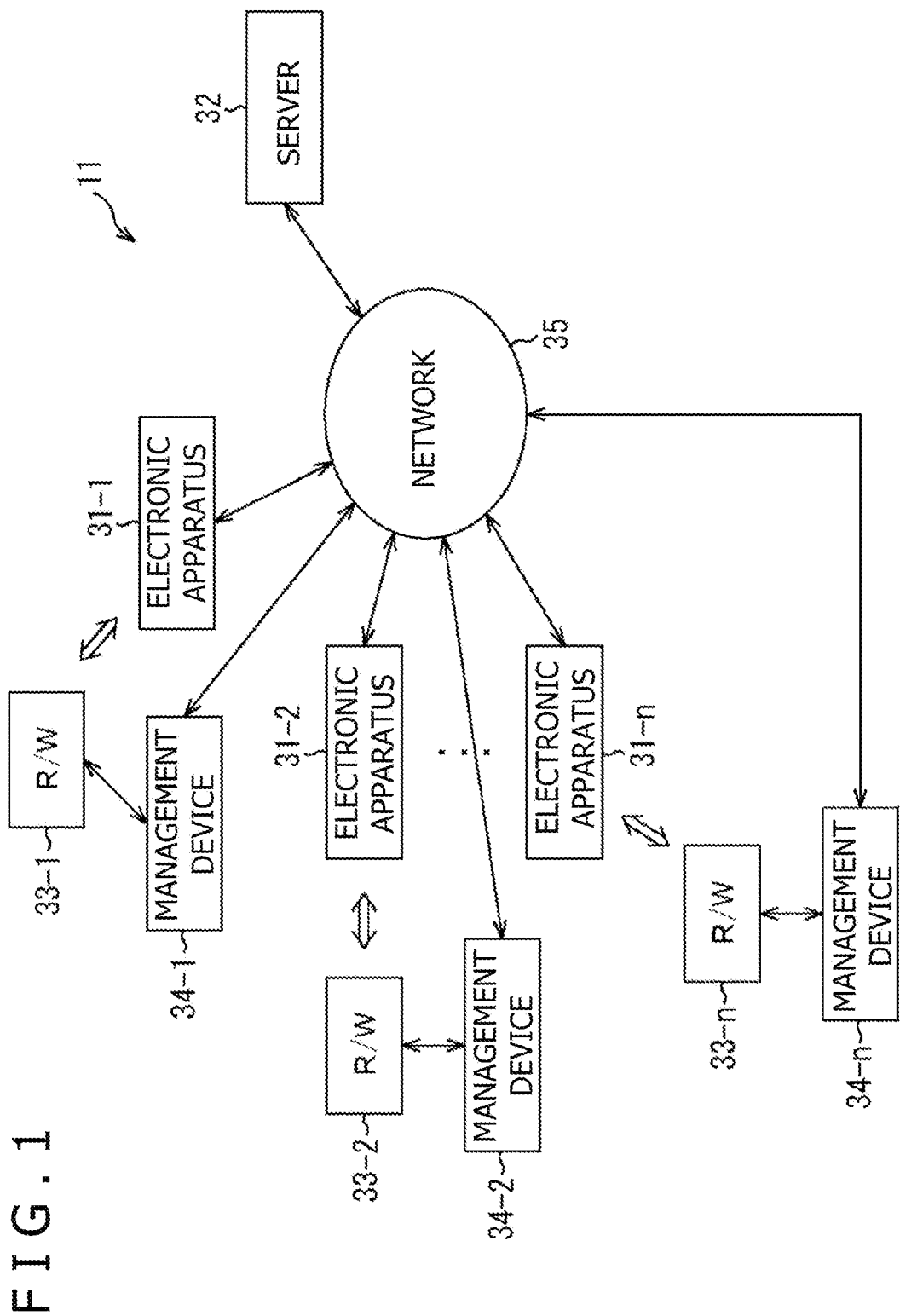
FIG. 1 is a diagram explaining a configuration example of an information processing system of the present disclosure.

FIG. 1 depicts a configuration example of an information processing system to which the technology of the present disclosure is applied.

According to the information processing system 11 in FIG. 1, an electronic apparatus including a secure element carried by the user registers (installs) an applet (within the secure element), and communicates with a management device functioning as a transaction device by using the registered applet to achieve various types of transaction processes.

According to the information processing system 11 in FIG. 1 thus configured, the applet registered in the electronic apparatus is registered in, deleted from, or re-added to the secure element in accordance with a behavior of the user.

For example, the applet herein performs a function as a stored-value card, such as a transit card and a prepaid card, in addition to the above-mentioned function of achieving settlements for a credit card account or a debit card account.

Moreover, the applet functions as an access card for security door access or the like, automobile control, boat control or the like for vehicle control or access, a loyalty card, a ticket (e.g., administration ID for administration procedures, electronic ticket for travels and events), a multifunction card (card used for access, identification, and settlements), or the like, for example.

Note that the various types of cards herein are presented by way of example to refer to credentials issued by a bank, a credit provider, a commercial entity, or an entity such as an administrative organ, for example.

The information processing system 11 in FIG. 1 is constituted by electronic apparatuses 31-1 to 31-n, a server 32, R/Ws (reader/writers) 33-1 to 33-n, and management devices 34-1 to 34-n. These components are configured to electrically communicate with each other via a network 35 constituted by the Internet, a dedicated line, or the like.

Note that the electronic apparatuses 31-1 to 31-n, each of the R/Ws (reader/writers) 33-1 to 33-n, and each of the management devices 34-1 to 34-n in FIG. 1 will be referred to as electronic apparatuses 31, R/Ws 33, and management devices 34, respectively, in a case where no distinction between these components is particularly needed.

Moreover, the electronic apparatuses 31, the R/Ws 33, and the management devices 34 in FIG. 1 are provided with one-to-one correspondence, and the same number of pieces are depicted for each component. However, the respective components need not be provided with one-to-one correspondence, and the same number of pieces are not required for each component.

Specifically, while the electronic apparatus 31-1, the R/W 33-1, and the management device 34-1 depicted in FIG. 1 are configured to correspond to and communicate with each other, the electronic apparatus 31-1 may be also mutually communicative with the R/W 33-2, the management device 34-2, the R/W 33-n, and the management device 34-n.

Moreover, only one unit of the server 32 is depicted in FIG. 1, the server 32 may be constituted by multiple computers or the like achievable by cloud computing or the like.

For example, the network 35 communicatively connects the electronic apparatuses 31-1 to 31-n, and the management devices 34-1 to 34-n each constituted by a wireless transaction device to the server 32 which manages a service provider and a transaction system.

At least any one of the electronic apparatuses 31-1 to 31-n communicates with any one of the management devices 34-1 to 34-n each constituted by a wireless transaction device via any one of the R/Ws 33-1 to 33-n by direct communication such as near field communication (NFC).

Each of the management devices 34-1 to 34-n communicates with any one of the electronic apparatuses 31-1 to 31-n via any one of the R/Ws 33-1 to 33-n to function as an open-close management device provided for an entrance gate in an event site or the like and using electronic tickets, a personal information disclosure management device based on administration IDs, and a ticket gate management device using transportation electronic passes, for example.

Moreover, each of the management devices 34-1 to 34-n is not limited to these examples but may function as other devices, such as a transit management device, a toll fee management device, a parking management transaction device, a point-of-sale management device, a wireless mobile management device, or an access management device such as a door and a lock.

Furthermore, each of the R/Ws 33-1 to 33-n is a device such as a wireless interface, for example, and practices communication with any one of the electronic apparatuses 31-1 to 31-n and any one of the management devices 34-1 to 34-n by wireless communication such as NFC wireless communication, wireless local area network (WLAN) wireless communication, Bluetooth (registered trademark) wireless communication, Zigbee (registered trademark) wireless communication, cellular wireless communication, and other types, for example.

For example, the server 32 is managed by a financial institution issuing credit cards and debit cards, a transportation system, a manufacturer of access devices such as doors and locks, an entity using an access device such as companies and schools, a manufacturer of vehicles such as automobiles, a retailer providing loyalty card accounts, a ticketing service provider providing tickets for events, a travel service provider providing travel tickets such as air tickets, any service provider generally capable of providing virtual or physical passes, tickets, cards for users, or the like.

For example, each of the electronic apparatuses 31-1 to 31-*n* is a personal computer, a smartphone, a peripheral device (e.g., digital camera, headphone), a tablet device, or a device including a wireless interface for at least any one of NFC wireless communication, WLAN wireless communication, Bluetooth (registered trademark) wireless communication, Zigbee (registered trademark) wireless communication, cellular wireless communication, and other types of wireless communication.

Each of the electronic apparatuses 31-1 to 31-*n* includes a secure element 58 (FIGS. 2 and 3) which requests the server 32 to provide an applet, installs (registers) the applet, and executes the installed applet to achieve various types of services in cooperation with the management device 34 via the R/W 33. Note that details of the secure element 58 will be described below with reference to FIG. 3.

Configuration Example of Electronic Apparatus

Figure 2:
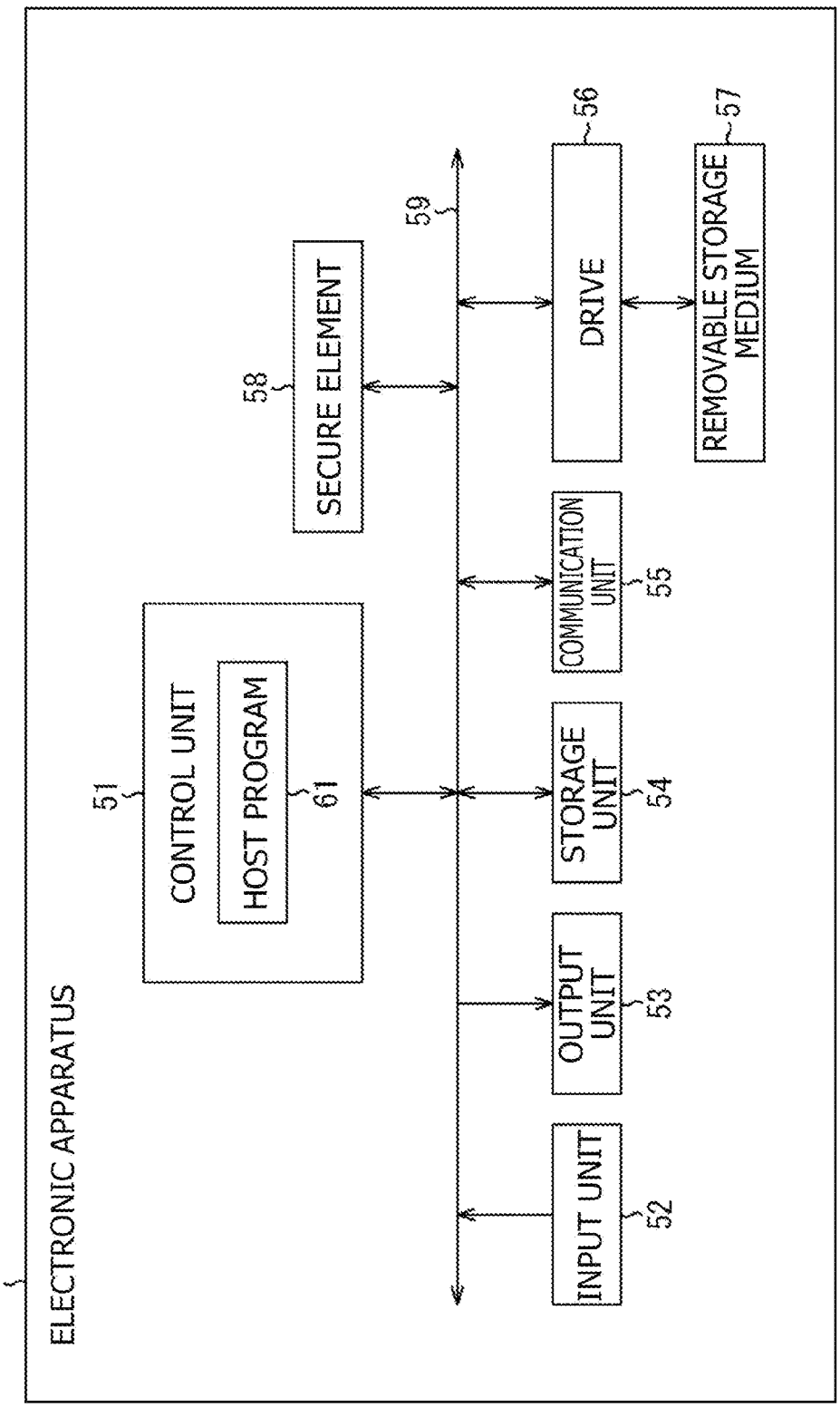
FIG. 2 is a diagram explaining a configuration example of an electronic apparatus in FIG. 1.

A configuration example of the electronic apparatus 31 in FIG. 1 will be subsequently described with reference to FIG. 2. The electronic apparatus 31 is constituted by a control unit 51, an input unit 52, an output unit 53, a storage unit 54, a communication unit 55, a drive 56, a removable storage medium 57, and the secure element 58. These components are connected to one another via a bus 59 to transmit and receive data and programs to and from each other.

The control unit 51 is constituted by a processor and a memory to control overall operations of the electronic apparatus 31.

Moreover, the control unit 51 executes a host program 61 to acquire and supply various types of triggers for managing applets installed in the secure element 58.

The input unit 52 is constituted by an input device which receives an input of an operation command from the user, such as a keyboard, or receives an input of voices, such as a microphone, to supply various types of input signals to the control unit 51.

The output unit 53 is constituted by an audio output unit such as a speaker, a display unit such as an LCD (Liquid Crystal Display) and an organic EL (Electro-Luminescence), a light emitting unit such as an LED (Light Emitting Diode), and others, and presents various types of processing results to the user under control by the control unit 51.

The storage unit 54 is constituted by an HDD (Hard Disk Drive), an SSD (Solid State Drive), a semiconductor memory, or the like, and writes or reads various types of data and programs including content data under control by the control unit 51.

The communication unit 55 transmits and receives various types of data and programs to and from various types of devices via the network 35 (FIG. 1) under control by the control unit 51.

Moreover, the communication unit 55 communicates with the management device 34 via the R/W 33 under control by the control unit 51.

The drive 56 reads and writes data from and to the removable storage medium 57 such as a magnetic disk (including flexible disk), an optical disk (including CD-ROM (Compact Disc-Read Only Memory) and a DVD (Digital Versatile Disc)), a magneto-optical disk (including MD (Mini Disc)), and a semiconductor memory.

The secure element 58 performs data communication with the management device 34 via the communication unit 55 and the R/W 33 to execute various types of processes. More specifically, the secure element 58 executes an installed applet to execute a process (command process) corresponding to a command (processing request) received from the communication unit 55. Thereafter, the secure element 58 transmits a response (processing response), which is an execution result of the command process, to the management device 34. Various processes corresponding to applet types are executed by the series of processes described above.

Moreover, the secure element 58 installs a corresponding applet on the basis of information as various triggers supplied from an external trigger device 131 (FIG. 5) and executes the installed applet, and further deletes or re-installs the applet as necessary. Note that details of the secure element 58 will be described below with reference to FIG. 3.

Configuration Example of Secure Element

A configuration example of the secure element 58 will be subsequently described with reference to FIG. 3.

For example, the secure element 58 is formed on a plastic card substrate (one example of card body) as an IC (Integrated Circuit) module including an IC chip. Specifically, the secure element 58 includes the IC module containing the IC chip, and the card substate where the IC module is embedded. For example, the IC chip is LSI (Large Scale Integration) such as one chip microprocessor.

The secure element 58 includes an I/F (interface) 72, a processor 71 constituted by a CPU (Central Processing Unit) or the like, a ROM (Read Only Memory) 73, a RAM (Random Access Memory) 74, and an EEPROM (Electrically Erasable Programmable ROM) 75.

For example, the I/F 72 performs serial data communication with the communication unit 55. The I/F 72 outputs data generated by parallel conversion of received serial data signals (e.g., 1-byte data) to the processor 71. Moreover, the I/F 72 converts the data acquired from the processor 71 by serial conversion, and outputs the data to the communication unit 55. For example, the I/F 72 receives a command from the communication unit 55, and transmits a response to the communication unit 55.

The processor 71 executes a program stored in the ROM 73 or the EEPROM 75 to execute various types of processes performed by the secure element 58. For example, the processor 71 executes a command process corresponding to a command received by the I/F 72.

A management applet 91 is stored in the ROM 73 (or EEPROM 75) beforehand. The processor 71 reads and executes the management applet 91 to manage installation, deletion, re-installation, and the like of applets used for various types of services described below.

In addition, it is assumed in the following description that processes achieved under the management applet 91 executed by the processor 71 are processes performed mainly by the management applet 91.

Specifically, the description continues on an assumption that the processes achieved under the management applet 91 executed by the processor 71 are processes executed by the management applet 91.

For example, the ROM 73 is a non-volatile memory such as a mask ROM, and stores programs for executing various types of processes performed by the secure element 58, and data such as a command table.

For example, the RAM 74 is a volatile memory such as a SRAM (Static RAM), and temporarily stores data used for performing various types of processes performed by the secure element 58.

For example, the EEPROM 75 is an electrically rewritable non-volatile memory. The EEPROM 75 stores various types of data used by the secure element 58. For example, the EEPROM 75 stores applets used for various types of services (application, security function) using the secure element 58. Note that the EEPROM 75 is presented only by way of example, and may have other configurations as long as an electrically rewritable memory can be constituted.

Figure 3:
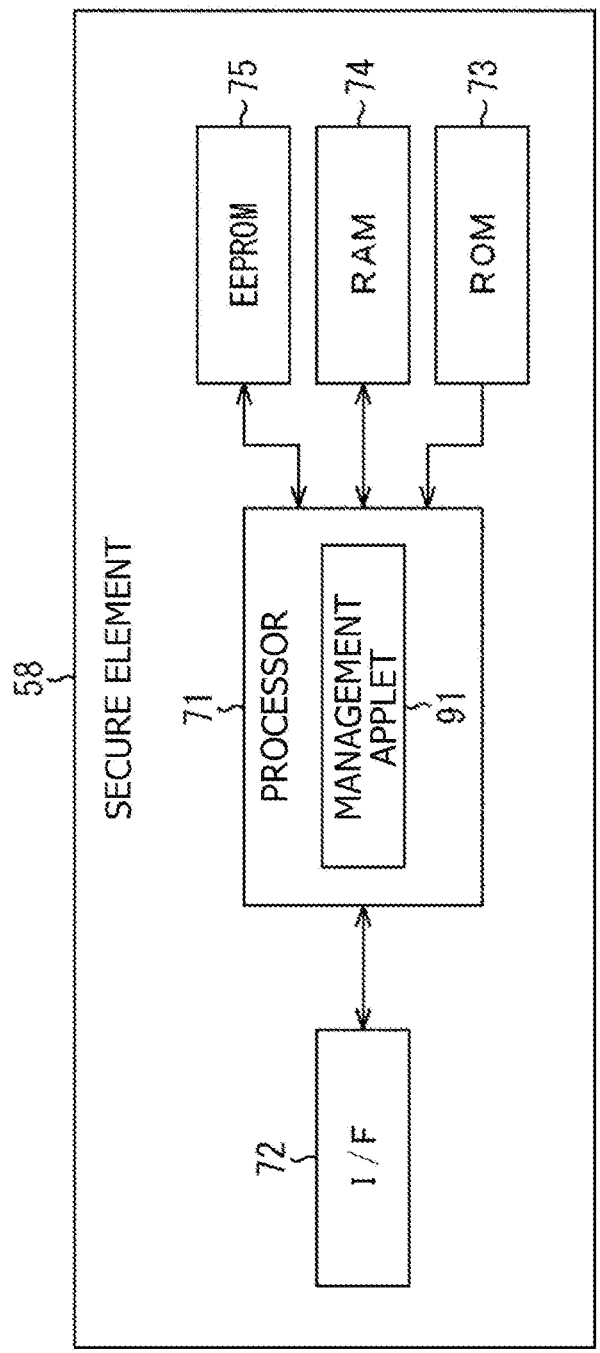
FIG. 3 is a diagram explaining a configuration example of a secure element in FIG. 2.

While described with reference to FIG. 3 is a case where the secure element 58 is a SIM (Subscriber Identity Module) card detachably attached to the electronic apparatus 31, the secure element 58 may be configured to be built in the body of the electronic apparatus 31, such as an eSIM (Embedded Subscriber Identity Module). The secure element 58 has an identical basic structure even in the case of the eSIM. Moreover, the secure element 58 may have configurations other than the SIM configuration. Furthermore, the management applet 91 may be installed and used similarly to an ordinary applet.

Configuration Example of Server

Figure 4:
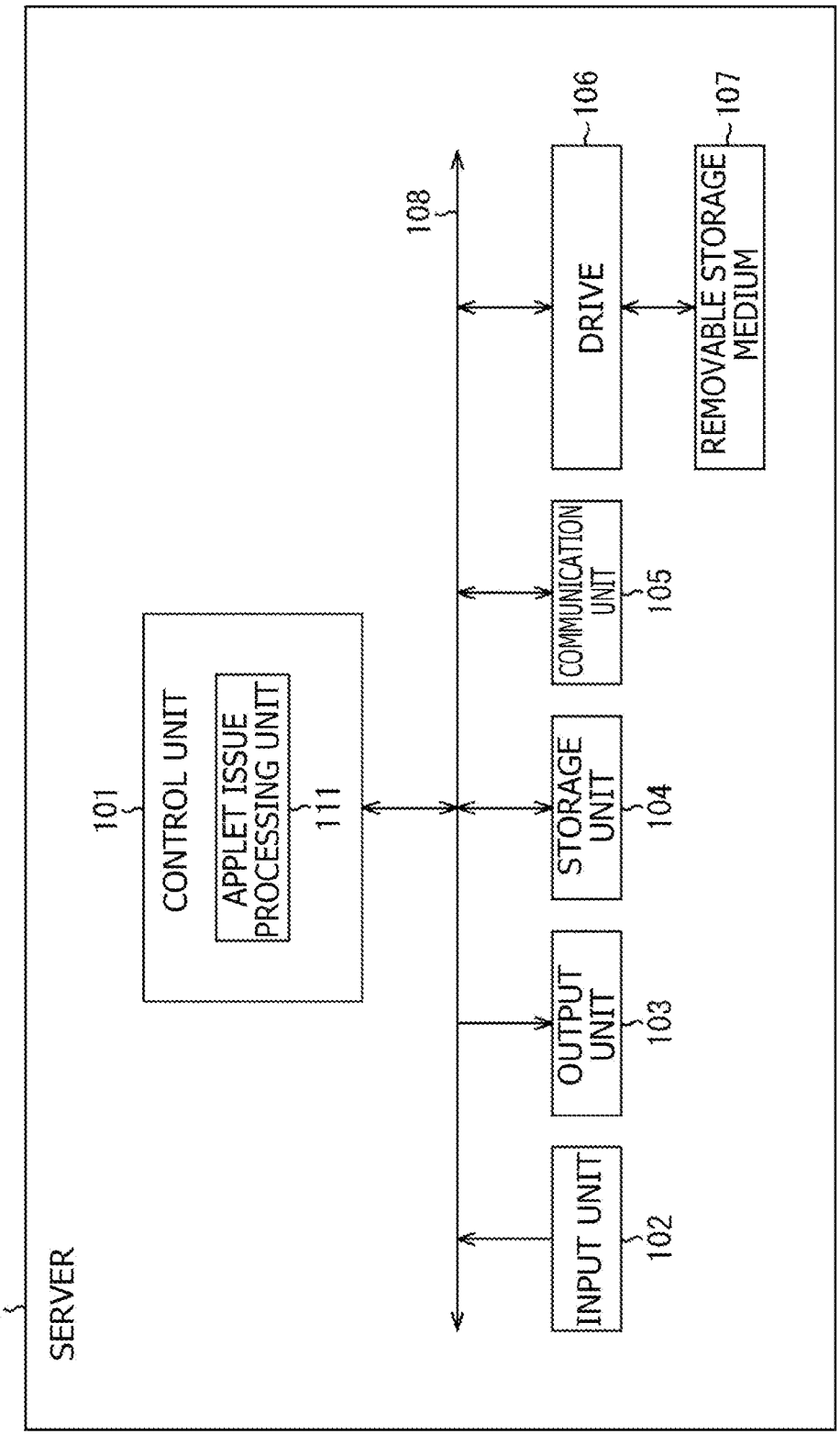
FIG. 4 is a diagram explaining a configuration example of a server in FIG. 1.

A configuration example of the server 32 in FIG. 1 will be subsequently described with reference to FIG. 4.

The server 32 is constituted by a control unit 101, an input unit 102, an output unit 103, a storage unit 104, a communication unit 105, a drive 106, and a removable storage medium 107. These components are connected to one another via a bus 108 to transmit and receive data and programs to and from each other.

The control unit 101 is constituted by a processor and a memory to control overall operations of the server 32.

Moreover, the control unit 101 includes an applet issue processing unit 111. In response to a request of installation of an applet managed by the secure element 58 of the electronic apparatus 31, the applet issue processing unit 111 issues the requested applet, supplies the applet to the electronic apparatus 31, and installs the applet in the electronic apparatus 31.

The input unit 102 is constituted by an input device which receives an input of an operation command from the user, such as a keyboard, or receives an input of voices, such as a microphone, to supply various types of input signals to the control unit 101.

The output unit 103 is constituted by an audio output unit such as a speaker, a display unit such as an LCD (Liquid Crystal Display) and an organic EL (Electro-Luminescence), a light emitting unit such as an LED (Light Emitting Diode), and others, and presents display of various types of search results under control by the control unit 101.

The storage unit 104 is constituted by an HDD (Hard Disk Drive), an SSD (Solid State Drive), a semiconductor memory, or the like, and writes or reads various types of data and programs including content data under control by the control unit 101.

The communication unit 105 is controlled by the control unit 101, and transmits and receives various types of data and programs to and from various types of devices by wire (or wirelessly (not depicted in the figure)) via a communication network represented by a LAN (Local Area Network) or the like.

The drive 106 reads and writes data from and to the removable storage medium 107 such as a magnetic disk (including flexible disk), an optical disk (including CD-ROM (Compact Disc-Read Only Memory), a DVD (Digital Versatile Disc)), a magneto-optical disk (including MD (Mini Disc)), and a semiconductor memory.

<Operation of Secure Element in Electronic Apparatus>

An operation of the secure element 58 included in the electronic apparatus 31 will be subsequently described with reference to functional block diagrams in FIGS. 5 and 6.

The secure element 58 requests the server 32 to issue an applet on the basis of a trigger supplied from the host program 61 in accordance with an applet type, and installs the issued applet.

Information provided as a trigger herein is position information, time information, elapsed-time information indicating time elapsed from installment of the applet, information input by an operation of the input unit 52 performed by the user, or the like.

When receiving supply of a predetermined trigger, the secure element 58 installs an applet, and comes into a state for executing a process corresponding to an applet type.

Moreover, when acquiring a different predetermined trigger corresponding to the installed applet type, the secure element 58 deletes the installed applet.

At this time, the secure element 58 deletes the installed applet while leaving information necessary for re-installing and using this deleted applet as a log without deletion of this information.

Moreover, when detecting a predetermined trigger supplied from the host program 61 in accordance with the applet type, the secure element 58 again requests the server 32 to issue the applet, and re-installs the issued applet.

The secure element 58 executes processes using information associated with the log and left without deletion so as to execute predetermined processes using the re-installed applet.

By performing the series of processes described above, the secure element 58 installs, deletes, or re-installs applets registered in a storage region of the secure element 58 in accordance with a behavior of the user or the like to achieve flexible use of a storage region of the secure element.

More specifically, the host program 61 includes a trigger acquisition unit 151 and an internal trigger detection unit 152.

The trigger acquisition unit 151 acquires position information as a trigger supplied from an external trigger device 131 constituted by a UWB (Ultra Wide Band), a GPS (Global Positioning System), a beacon, or the like.

Moreover, the trigger acquisition unit 151 acquires, as triggers, time information supplied from the internal trigger detection unit 152, information indicating an elapsed time from installation of the predetermined applet, and operation information generated by an operation of the input unit 52 performed by the user, and supplies these triggers to the secure element 58.

The secure element 58 includes the management applet 91.

The management applet 91 is a dedicated applet which manages installation, deletion, and re-installation of applets for achieving predetermined processes, and is installed in the secure element 58 as a fixed applet.

More specifically, the management applet 91 requests the server 32 to issue applets in accordance with applet types to be installed, and stores triggers for installation conditions as an issue trigger rule 171.

Moreover, at the time of installation of an applet, the management applet 91 stores a deletion trigger rule 172 where a trigger corresponding to a condition for deleting the installed applet has been registered. At the time of deletion of the applet, the management applet 91 also deletes the deletion trigger rule 172 where information indicating a trigger for deleting the applet has been registered.

Accordingly, when receiving supply of a trigger from the trigger acquisition unit 151 of the host program 61, the management applet 91 determines whether or not the corresponding trigger is present with reference to the issue trigger rule 171.

Thereafter, in a case where the acquired trigger is a trigger stored in the issue trigger rule 171 and corresponding to a condition for installing a predetermined applet, the management applet 91 requests the host program 61 to issue the predetermined applet.

The host program 61 accesses the server 32 by controlling the communication unit 55, and requests the server 32 to issue the predetermined applet.

By this process, the host program 61 acquires the applet issued by the server 32, and supplies the applet to the management applet 91.

Figure 5:
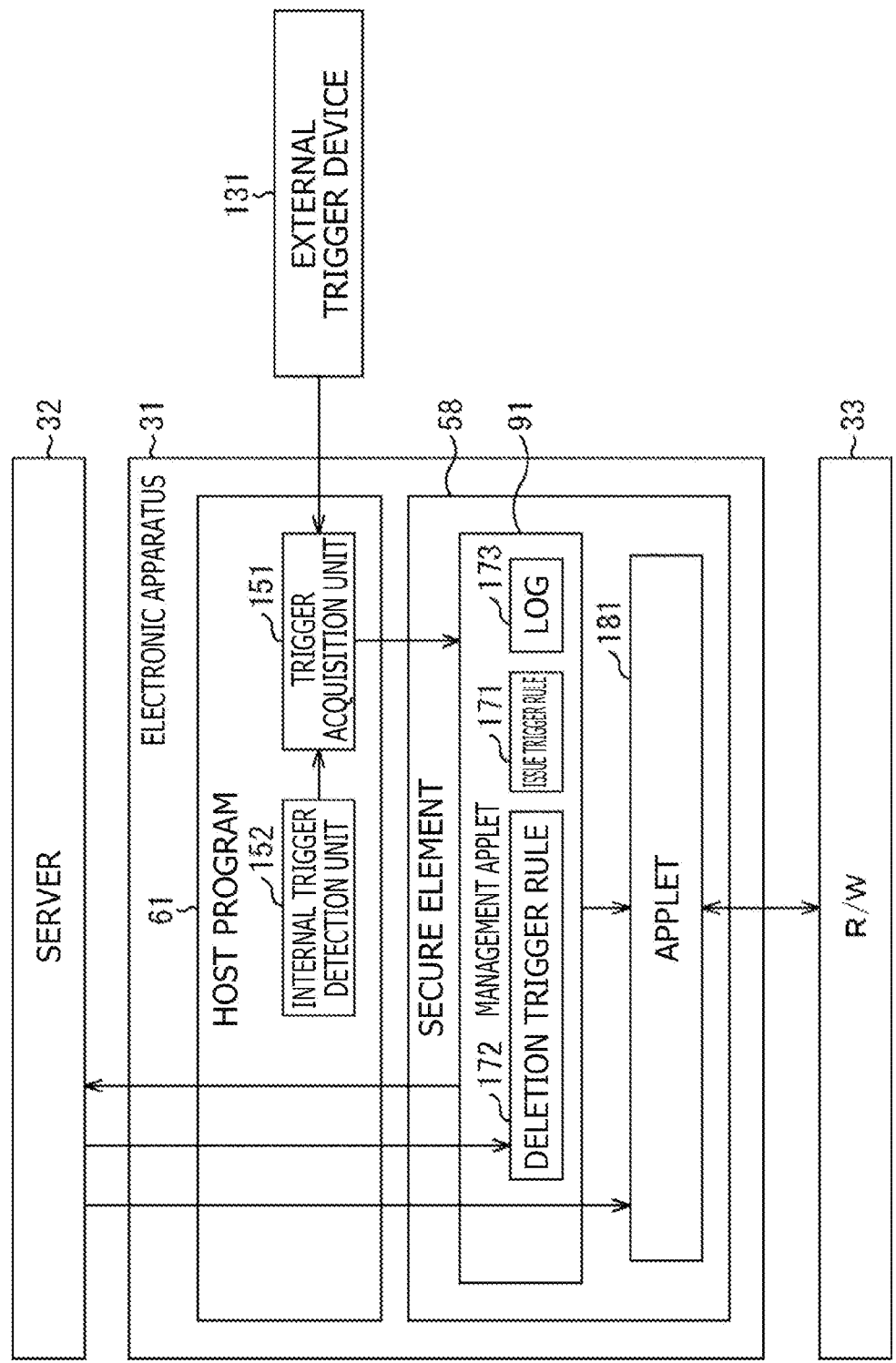
FIG. 5 is a diagram explaining an operation for installing an applet in the secure element.

The management applet 91 acquires the applet issued by the server 32 via the host program 61, and installs the acquired applet within the secure element 58 as an applet 181 indicated by a solid line in FIG. 5, for example.

At this time, the management applet 91 registers information indicating a trigger as a condition for deleting the installed applet 181 in the deletion trigger rule 172.

After installation of the new applet 181 in the secure element 58 in this manner, (the processor 71 (FIG. 3) of) the secure element 58 is allowed to execute a corresponding process by executing the installed applet 181.

Figure 6:
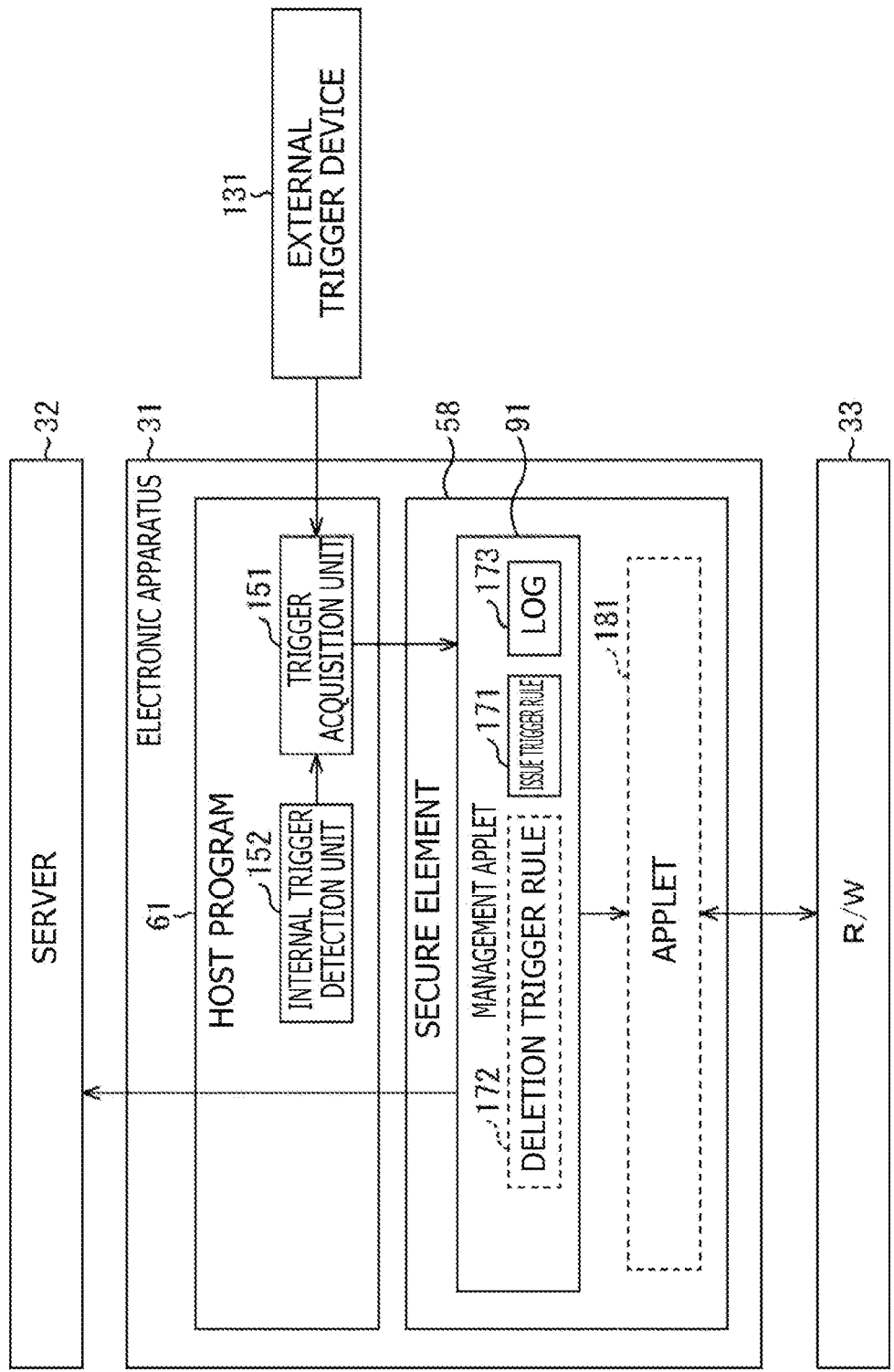
FIG. 6 is a diagram explaining an operation for deleting an applet in the secure element.

Moreover, in a case where a trigger supplied from the trigger acquisition unit 151 of the host program 61 is a trigger registered in the deletion trigger rule 172 and corresponding to a condition for deleting a predetermined applet, the management applet 91 deletes (uninstalls) the installed applet 181 as indicated by a dotted line in FIG. 6, for example.

At this time, the management applet 91 deletes the deletion trigger rule 172 containing the registered trigger as the condition for deleting the applet 181 as indicated by a dotted line.

Thereafter, the management applet 91 notifies the server 32 of information indicating completion of deletion of the applet 181 via the host program 61.

Moreover, the management applet 91 leaves, as a log 173, information necessary for re-installing and executing the applet 181 once installed, and stores the log 173.

In this case, at the time of deletion of the applet 181 once installed, a type of the information left as the log 173 may be registered in the deletion trigger rule 172 in association with the trigger as the condition for deletion, for example.

Moreover, at the time of re-installation of the applet, the management applet 91 reads the information associated with the stored log 173 and transmits the information to the server 32 via the host program 61 as necessary, and then re-installs the applet corresponding to the information associated with the log 173.

When information indicating a trigger acquired by the trigger acquisition unit 151 in accordance with a behavior of the user including an operation input corresponding to a user operation, position information associated with a shift, time information, and an elapsed time from installation of the applet is a trigger corresponding to a condition for installing the applet determined by the issue trigger rule 171, the secure element 58 performs the processes described above to install the applet at detection timing of the trigger.

Moreover, when information indicating a trigger acquired by the trigger acquisition unit 151 is a trigger corresponding to a condition for deleting an applet and determined by the deletion trigger rule 172, the applet is deleted (uninstalled) at detection timing of the trigger.

In this manner, the applet 181 is installed in the secure element 58, or the installed applet 181 is deleted or re-installed in accordance with a user behavior corresponding to a trigger set according to a type of the applet 181.

As a result, the applet 181 is installed in the secure element 58 at necessary timing according to the type of the applet 181, and the installed applet 181 is deleted (uninstalled) at other unnecessary timing. Accordingly, flexible use of a limited storage region in the secure element 58 is achievable.

Note that installation and uninstallation of the applet to and from the secure element 58 are functions achievable only by the server 32 in principle.

Specifically, an applet is issued by the server 32 in response to a request for installation of the applet given to the server 32 from the management applet 91, and is installed in the secure element 58 by the server 32.

Accordingly, for example, the host program 61 is unable to issue the applet to the secure element 58 and install or uninstall the issued applet.

Accordingly, the description hereinafter similarly continues on an assumption of an expression that the management applet 91 requests the server 32 to issue an applet and install the issued applet. Specifically, however, the server 32 issues an applet and installs the issued applet in the secure element 58 in response to a request for applet installation given from the management applet 91 as described above.

According to the present disclosure, however, the management applet 91 is provided within the secure element 58, and therefore is configured to execute applet uninstallation (deletion) independently.

As a result, for example, the management applet 91 is capable of independently uninstalling an unnecessary applet installed in the secure element 58 even in an environment where communication with the server 32 is disabled. Accordingly, flexible use of the limited storage region in the secure element 58 is achievable.

<Applet Issuing Process>

An applet issuing process will be subsequently described with reference to a flowchart in FIG. 7.

In step S11, the trigger acquisition unit 151 of the host program 61 determines whether or not at least any item of information recognizable as triggers, such as position information received from the external trigger device 131, time information or elapsed-time information received from the internal trigger detection unit 152, and operation information generated by an operation of the input unit 52 performed by the user, has been detected, and repeats a similar process until detection of any one of these.

In a case where any one of the triggers has been detected in step S11, the process proceeds to step S12.

In step S12, the trigger acquisition unit 151 acquires information associated with the detected trigger.

In step S13, the trigger acquisition unit 151 supplies the acquired information associated with the trigger to the management applet 91 of the secure element 58.

In step S31, the management applet 91 acquires the information associated with the trigger and supplied from the trigger acquisition unit 151.

In step S32, the management applet 91 determines whether or not the trigger corresponds to a trigger as a condition for requesting issue of the applet with reference to the issue trigger rule 171 for the acquired information associated with the trigger.

In a case where the acquired information associated with the trigger is not the trigger corresponding to the condition for requesting issue of the applet in step S32, the process ends.

On the other hand, in a case where the acquired information associated with the trigger is the trigger corresponding to the condition for requesting issue of the applet in step S32, the process proceeds to step S33.

In step S33, the management applet 91 requests the host program 61 to issue an applet.

In step S14, the host program 61 acquires the applet issue request from the management applet 91.

In step S15, the host program 61 requests the server 32 to issue the applet by controlling the communication unit 55.

In step S51, the applet issue processing unit 111 executed by the control unit 101 of the server 32 acquires an applet issue request from the electronic apparatus 31 by controlling the communication unit 105.

In step S52, the applet issue processing unit 111 requests the electronic apparatus 31 to generate a log, i.e., information re-used at the time of use of the applet requested to be issued, by controlling the communication unit 105.

In step S16, the host program 61 acquires the log request from the server 32 via the communication unit 55.

In step S17, the host program 61 notifies the management applet 91 included in the secure element 58 of the log request received from the server 32.

In step S34, the management applet 91 acquires the log request from the server 32 via the host program 61.

In step S35, the management applet 91 reads information associated with the log 173 of the applet stored and requested to be issued in response to the log request, and transmits the read information to the host program 61.

In step S36, the management applet 91 deletes or retains the information associated with the requested log in accordance with the applet type. Specifically, the management applet 91 deletes information contained in a log unlikely to be continuously used in the future, and retains a log likely to be further continuously used in the future according to the type of the applet type.

On the other hand, in step S18, the host program 61 acquires the log transmitted from the management applet 91.

In step S19, the host program 61 transmits, to the server 32, the information associated with the log transmitted from the management applet 91 by controlling the communication unit 55.

In step S53, the applet issue processing unit 111 of the server 32 acquires the log transmitted from the management applet 91 via the host program 61 by controlling the communication unit 105.

In steps S54 and S71, the applet issue processing unit 111 installs the applet 181 in the secure element 58 of the electronic apparatus 31 as indicated by the solid line in FIG. 5 by controlling the communication unit 105. At this time, the applet issue processing unit 111 installs the applet using the transmitted log as necessary.

In steps S55 and S37, the applet issue processing unit 111 registers a trigger as a condition for deleting the applet installed in the deletion trigger rule 172 of the management applet 91 by controlling the communication unit 105.

At this time, the applet issue processing unit 111 registers types of information to be retained as a log and information to be deleted in the deletion trigger rule 172 in association with the installed applet in processing in step S36.

Specifically, when a log is requested in the processing in step S36 described above, the management applet 91 deletes or retains information associated with the requested log according to the type of the applet 181, on the basis of the information to be retained as a log and the information to be deleted both as information registered in association with the applet in the deletion trigger rule 172.

In a case where a trigger generated in accordance with a behavior of the user is the trigger registered in the issue trigger rule 171 in advance and corresponding to the condition for installing the applet, the applet 181 is installed by the process described above. In this manner, the installed applet 181 is read by the R/W 33, and the management device 34 is allowed to perform a predetermined process on the basis of the read information.

Figure 7:
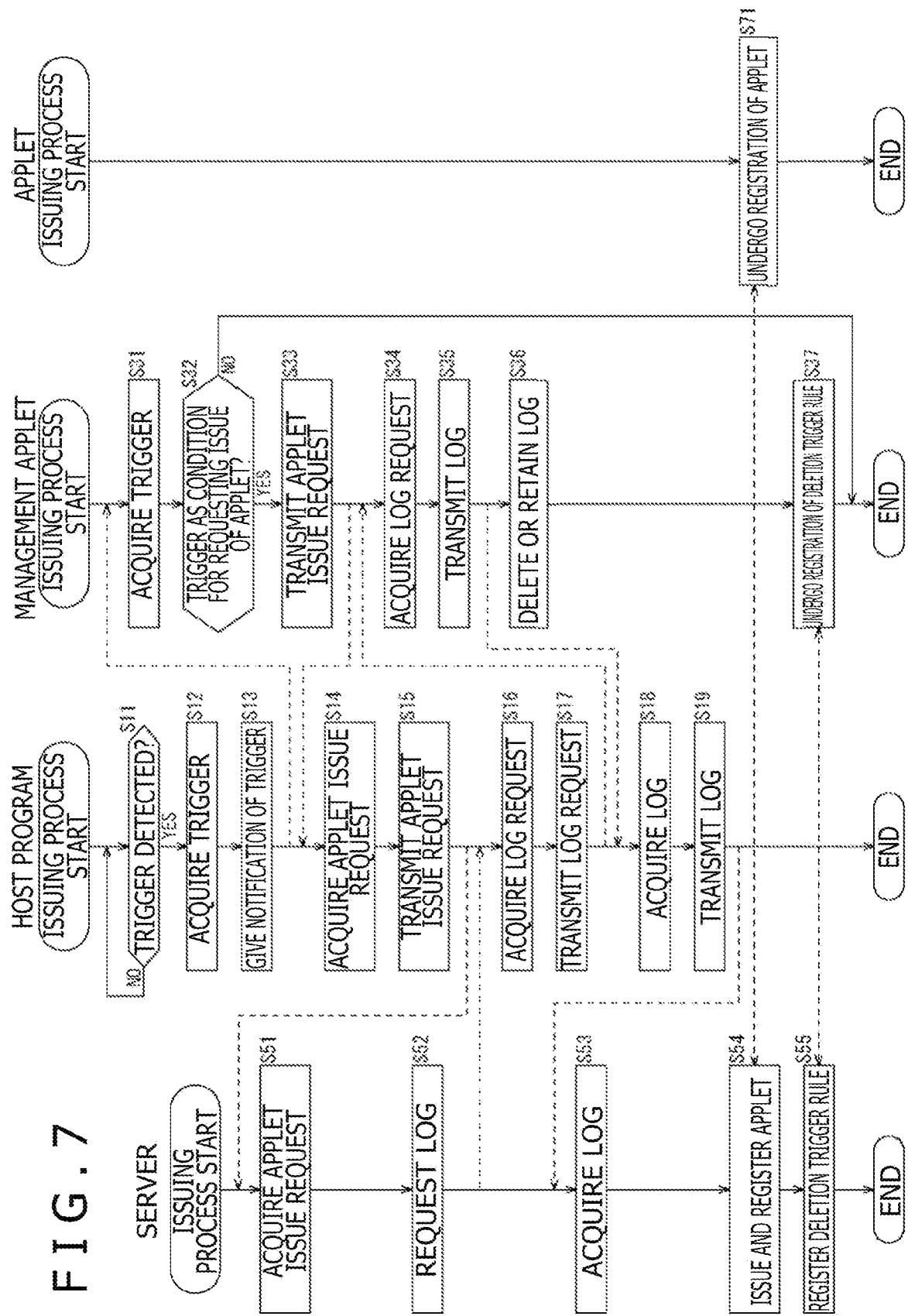
FIG. 7 is a flowchart explaining an applet issuing process.

Note that the information associated with the log and supplied by the series of processes in steps S52, S16, S17, S34, S35, S18, S19, and S53 in the flowchart in FIG. 7 is information in the process in the case of the applet previously installed. Accordingly, substantial log information may be absent in initial installation depending on situations.

<Applet Deleting Process>

Figure 8:
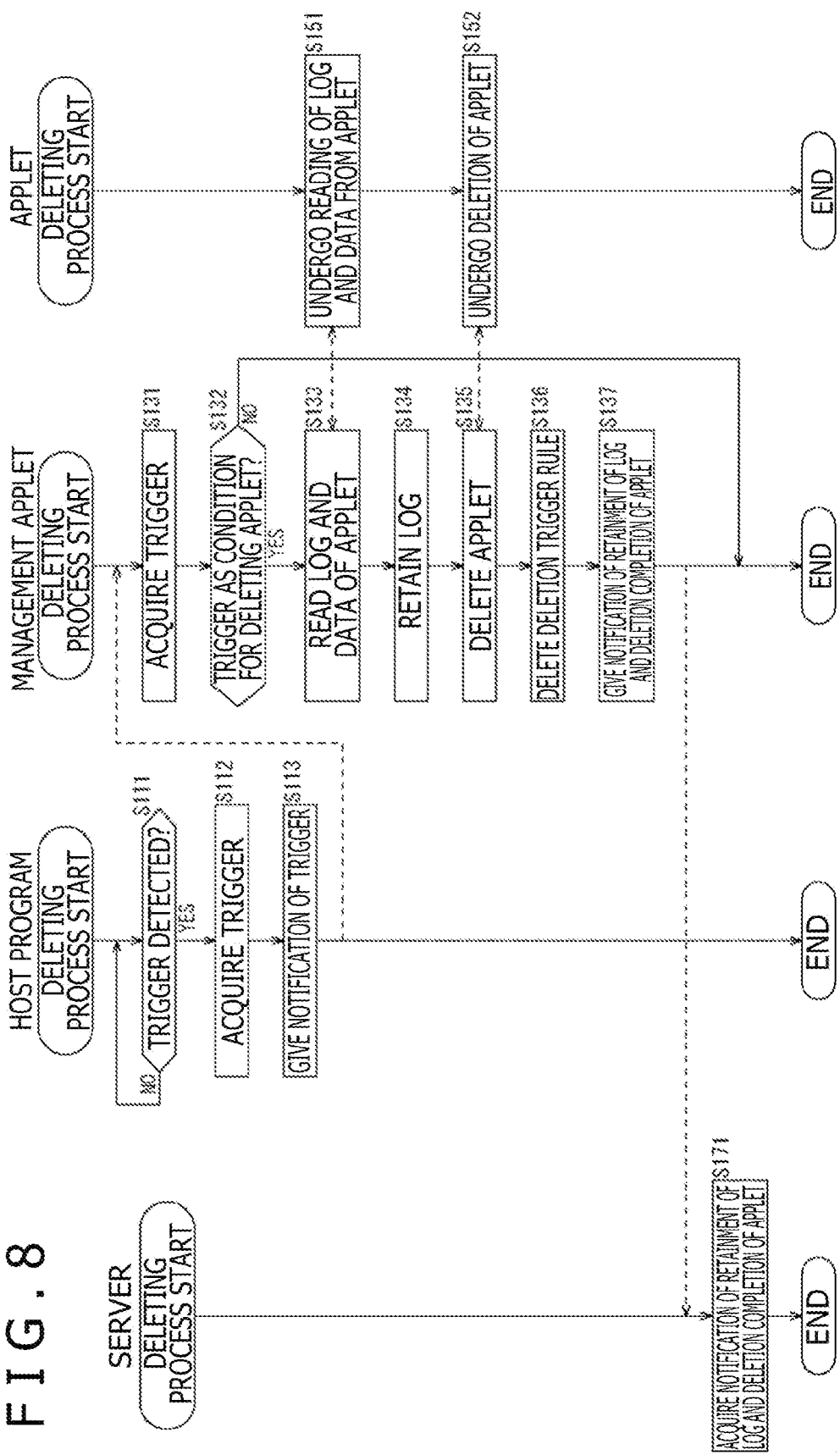
FIG. 8 is a flowchart explaining an applet deleting process.

A deleting process for deleting an applet installed by the applet issuing process in FIG. 7 will be subsequently described with reference to a flowchart in FIG. 8.

In step S111, the trigger acquisition unit 151 of the host program 61 determines whether or not at least any item of information recognizable as triggers, such as position information received from the external trigger device 131, time information or elapsed-time information received from the internal trigger detection unit 152, and operation information generated by an operation of the input unit 52 performed by the user, has been detected, and repeats a similar process until detection of any one of these.

In a case where any one of the triggers has been detected in step S111, the process proceeds to step S112.

In step S112, the trigger acquisition unit 151 acquires information associated with the detected trigger.

In step S113, the trigger acquisition unit 151 supplies the acquired information associated with the trigger to the management applet 91 of the secure element 58.

In step S131, the management applet 91 acquires the information associated with the trigger and supplied from the trigger acquisition unit 151.

In step S132, the management applet 91 determines whether or not the trigger corresponds to a trigger as a condition for deleting the applet with reference to the deletion trigger rule 172 for the acquired information associated with the trigger.

In a case where the acquired information associated with the trigger is not the trigger corresponding to the condition for deleting the applet in step S132, the process ends.

On the other hand, in a case where the acquired information associated with the trigger is the trigger corresponding to the condition for deleting the applet in step S132, the process proceeds to step S133.

In steps S133 and S151, the management applet 91 reads a log and data from the installed applet 181.

In step S134, the management applet 91 retains the log read from the installed applet 181.

Note that the information associated with the log and retained herein is information which is one item of the information registered in the log 173, and is registered as the information indicating the type retained as a log in association with the applet 181 of the deletion trigger rule 172 in the issuing process described above. The information registered as the information indicating the type for deletion is deleted.

In steps S135 and S152, the management applet 91 deletes the applet 181.

In step S136, the management applet 91 deletes the deletion trigger rule 172 where the trigger as the condition for deleting the deleted applet 181 has been registered.

In step S137, the management applet 91 notifies the server 32 of retainment of the log and completion of deletion of the applet 181 via the host program 61.

In step S171, the applet issue processing unit 111 of the server 32 receives a notification indicating retainment of the log transmitted from the management applet 91 of the electronic apparatus 31 and completion of deletion of the applet 181.

In a case where a trigger detected as a result of a behavior of the user is a trigger as a condition for deleting an installed applet, the applet is deleted, and a log is retained as necessary by the process described above.

In this manner, the installed applet is deleted by the trigger detected in accordance with the behavior of the user. Accordingly, deletion of an unnecessary applet is achievable without the necessity of consciously deleting the applet by the user.

Moreover, at the time of re-installation of the applet, information associated with the log necessary for this process is retained. Accordingly, a process based on the retained log can be practiced when the applet is re-installed.

As a result, flexible use of a limited storage region within the secure element 58 is achievable.

Moreover, applet management is allowed under a secure environment of the secure element 58 and the server 32 by installing or deleting applets in accordance with exchanges between the management applet 91 and the server 32 provided within the secure element 58. Accordingly, security in applet management can improve.

Note that, in the example described above, the server 32 is notified of completion of deletion of the applet and retainment of the log at the time of deletion of the applet. However, in a state where communication between the electronic apparatus 31 and the server 32 is not established, the notification indicating completion of deletion of the applet and retainment of the log and given to the server 32 may be omitted. This notification may be transmitted at the time of recovery of the communication state.

In this manner, the electronic apparatus 31 can delete an unnecessary applet even in the state where communication between the electronic apparatus 31 and the server 32 is not established, e.g., in an environment of a stand-alone state of the electronic apparatus 31 where radio waves are difficult to reach from the inside of an airplane or a cellular phone. Accordingly, flexible use of the limited storage region of the secure element 58 is achievable regardless of the environment of communication with the server 32.

<Case of Applet as Electronic Ticket>

An example described next will be a case of an applet constituting an electronic ticket used in an event or the like.

Figure 9:
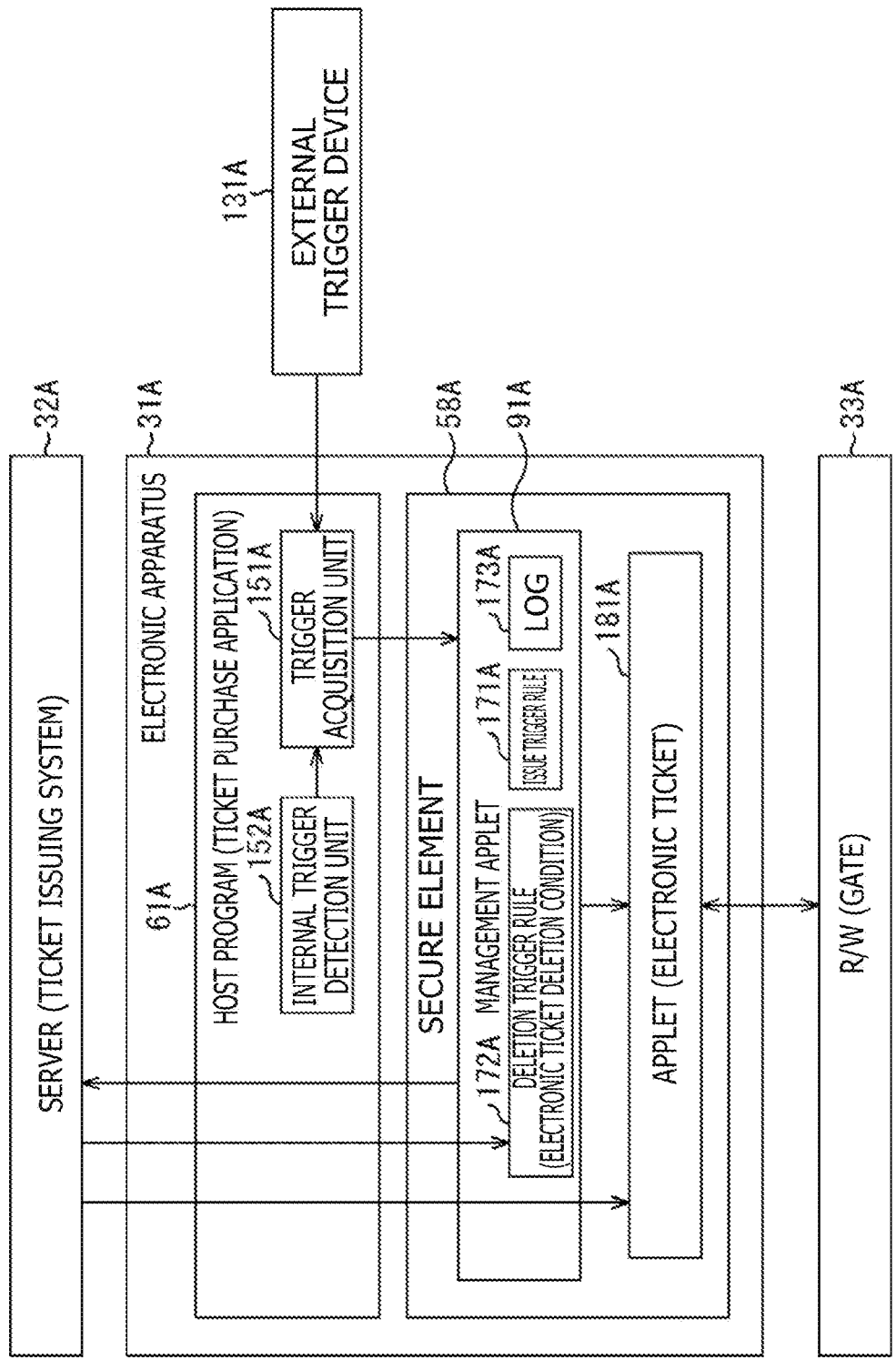
FIG. 9 is a diagram explaining an operation for installing an applet as an electronic ticket.

Specifically, in this case, the server 32 is constituted by a server 32A functioning as a ticket issuing system as depicted in FIG. 9.

Moreover, the electronic apparatus 31 is constituted by an electronic apparatus 31A carried by the user who purchases an electronic ticket for entering an event.

The electronic apparatus 31A herein includes a host program 61A and a secure element 58A.

The host program 61A represents a form of the host program 61 functioning as a ticket purchase application (application program), and has a basic function similar to that of the host program 61.

Moreover, the host program 61A includes a trigger acquisition unit 151A and an internal trigger detection unit 152A. The trigger acquisition unit 151A and the internal trigger detection unit 152A have basic functions similar to those of the trigger acquisition unit 151 and the internal trigger detection unit 152, respectively.

Furthermore, the management applet 91A represents an applet 181A representing a form in a case where the applet 181 functions as an electronic ticket, and has a basic function similar to that of the management applet 91.

Specifically, when the internal trigger detection unit 152A detects a trigger as an input of an operation requesting purchase of the electronic ticket and achieved by operating the input unit 52, for example, the trigger acquisition unit 151A acquires the detected trigger and supplies the trigger to the management applet 91A.

The management applet 91A determines whether or not the detected trigger is a trigger as a condition for requesting issue of the electronic ticket with reference to the issue trigger rule 171A for the detected trigger.

For example, as a trigger corresponding to the condition for requesting issue of the applet as the electronic ticket, a trigger as an input of an operation for requesting purchase of the electronic ticket is registered in the issue trigger rule 171A.

Accordingly, in a case where the supplied trigger is a trigger as an input of the operation requesting purchase of the electronic ticket and achieved by operating the input unit 52, and also is a trigger registered in the issue trigger rule 171A, the management applet 91A requests the server 32A to issue the electronic ticket, and installs the applet 181A as an electronic ticket indicated by a solid line in FIG. 9.

At this time, the management applet 91A registers, as the deletion trigger rule 172A, information indicating a trigger as a condition for deleting the electronic ticket, i.e., a condition for deleting the applet 181A as the electronic ticket.

For example, the condition for deleting the electronic ticket is time information indicating a time and date after a start of the event.

The issue trigger rule 171A herein represents a form at the time of storage of a condition for requesting issue of the electronic ticket as the issue trigger rule 171, and has a basic function similar to that of the issue trigger rule 171. Moreover, the deletion trigger rule 172A herein represents a form at the time of storage of a condition for deleting the electronic ticket as the deletion trigger rule 172, and has a basic function similar to that of the deletion trigger rule 172.

When the applet 181A as the electronic ticket is installed in the secure element 58A, the applet 181A is read by the R/W 33A provided at a gate of the event site, and thereby is supplied to the management device 34 which manages entrance of the event. If the applet 181A is recognized as a proper electronic ticket, for example, the gate of the event site opens, and the user carrying the electronic apparatus 31A is allowed to enter the event site.

Figure 10:
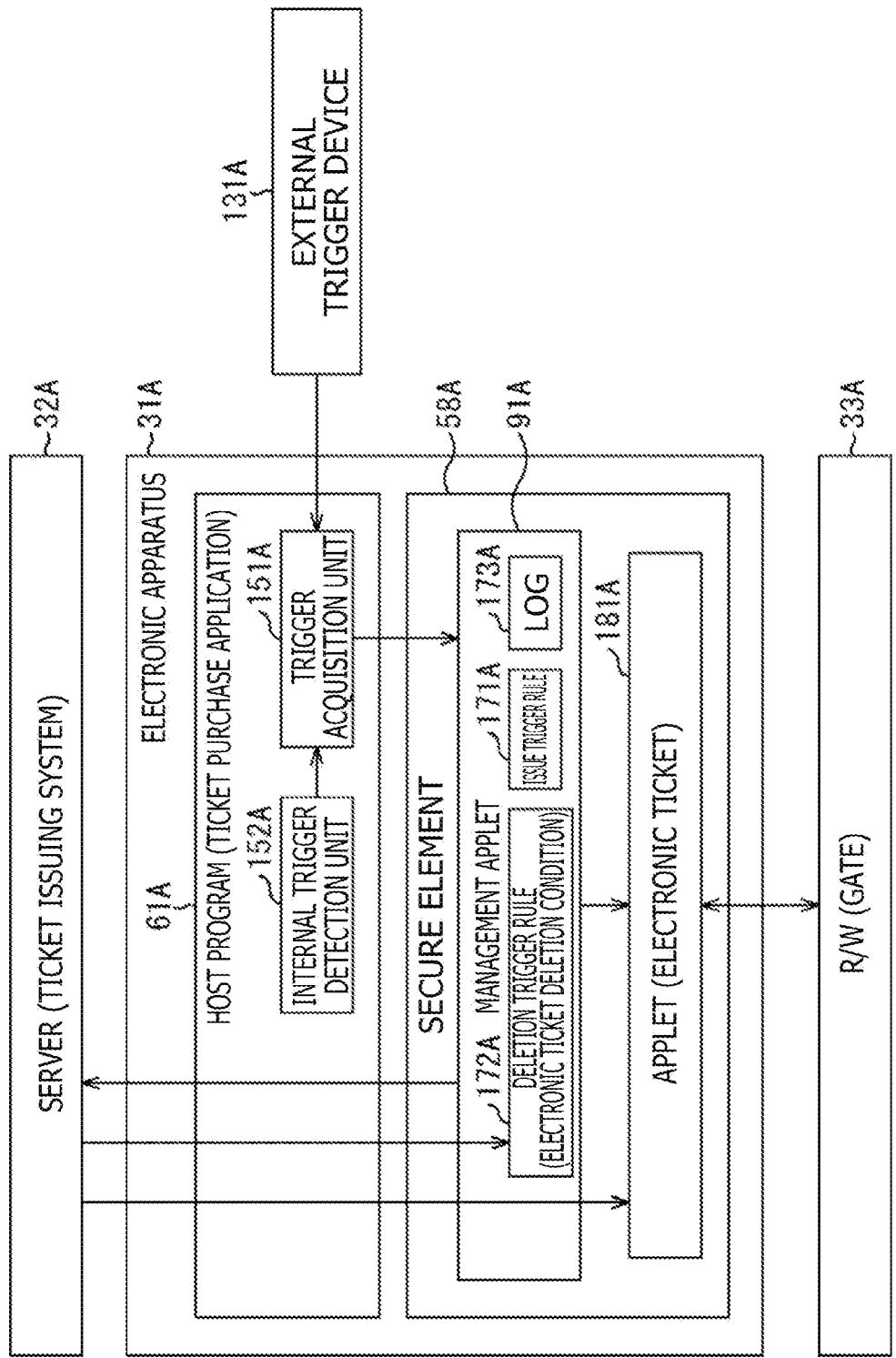
FIG. 10 is a diagram explaining an operation for deleting an applet as an electronic ticket.

Moreover, the management applet 91A deletes the applet 181A as the installed electronic ticket as indicated by a dotted line in FIG. 10 with reference to the deletion trigger rule 172 for the detected trigger when the trigger is time information indicating a time and date after a start of the event described above and meeting the condition for deleting the electronic ticket.

At this time, the management applet 91A also deletes the deletion trigger rule 172A which is the condition for deleting the electronic ticket as indicated by a dotted line in FIG. 10.

By the series of processes described above, the applet as the electronic ticket is installed in response to a trigger as an operation requesting purchase of the electronic ticket of the event site when the user performs this purchase request operation. Moreover, the applet as the electronic ticket is deleted in response to a trigger which is detection of time information indicating a time and data after the start of the event when this time information is detected.

As a result, the applet as the electronic ticket registered in the storage region of the secure element can be installed or deleted in accordance with the behavior of the user. Accordingly, flexible use of the storage region of the secure element is achievable.

<Electronic Ticket Issuing Process>

Figure 11:
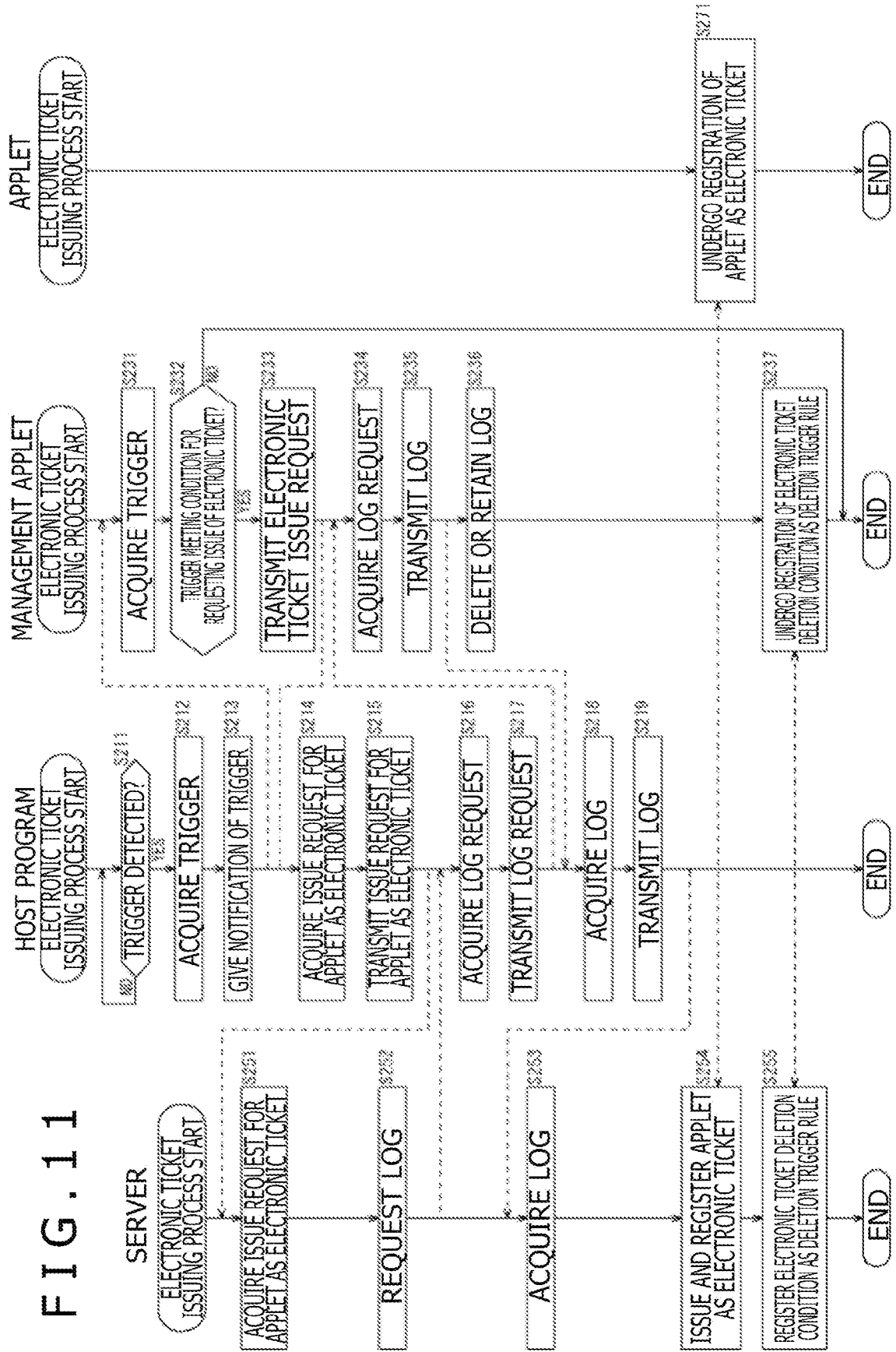
FIG. 11 is a flowchart explaining an electronic ticket issuing process.

An electronic ticket issuing process for installing the applet 181A as an electronic ticket will be subsequently described with reference to a flowchart in FIG. 11.

In step S211, the trigger acquisition unit 151A of the host program 61A determines whether or not at least any item of information recognizable as triggers, such as position information received from an external trigger device 131A, time information or elapsed-time information received from the internal trigger detection unit 152, and operation information generated by an operation of the input unit 52 or the like, has been detected as a trigger, and repeats a similar process until supply of any one of these.

In a case where any one of the triggers has been detected in step S211, the process proceeds to step S212.

In step S212, the trigger acquisition unit 151A acquires the detected trigger.

In step S213, the trigger acquisition unit 151A supplies the acquired trigger to the management applet 91A of the secure element 58A.

In step S231, the management applet 91A acquires information associated with the trigger and supplied from the trigger acquisition unit 151A.

In step S232, the management applet 91A determines whether or not the trigger corresponds a condition for issuing the applet as the electronic ticket with reference to the issue trigger rule 171A for the acquired information associated with the trigger.

In a case where the acquired information associated with the trigger is not the trigger corresponding to the condition for issuing the applet as the electronic ticket in step S232, the process ends.

Moreover, in a case where the acquired information associated with the trigger is the trigger corresponding to the condition for issuing the applet as the electronic ticket in step S232, the process proceeds to step S233.

In step S233, the management applet 91A requests the host program 61A to issue the applet as the electronic ticket.

In step S214, the host program 61A acquires the request for issuing the applet as the electronic ticket from the management applet 91A.

In step S215, the host program 61A requests the server 32A to issue the applet as the electronic ticket by controlling the communication unit 55.

In step S251, the applet issue processing unit 111 of the control unit 101 of the server 32A acquires the request for issuing the applet as the electronic ticket from the electronic apparatus 31 by controlling the communication unit 105.

In step S252, the applet issue processing unit 111 requests the electronic apparatus 31A to generate, by controlling the communication unit 105, a log which is information re-used at the time of use of the applet as the electronic ticket requested to be issued.

For example, the log herein is information indicating a point given every time the electronic ticket is purchased, information indicating a discount in accordance with the number of times of purchase, or the like.

In step S216, the host program 61A acquires the log request from the server 32 via the communication unit 55.

In step S217, the host program 61A notifies the management applet 91A included in the secure element 58A of the log request received from the server 32A.

In step S234, the management applet 91A acquires the log request from the server 32A via the host program 61A.

In step S235, the management applet 91A reads information stored in the log and associated with the applet as the electronic ticket requested to be issued, and transmits the read information to the host program 61 in response to the log request.

In step S236, the management applet 91A retains information indicating the point or the discount, for example, as the log associated with the request for issue of the applet as the electronic ticket.

On the other hand, in step S218, the host program 61A acquires the log transmitted from the management applet 91A.

In step S219, the host program 61A transmits the information associated with the log received from the management applet 91 to the server 32A by controlling the communication unit 55.

In step S253, the applet issue processing unit 111 of the server 32A acquires the transmitted log by controlling the communication unit 105.

In steps S254 and S271, the applet issue processing unit 111 installs the applet 181A as the electronic ticket in the secure element 58A of the electronic apparatus 31A by controlling the communication unit 105. At this time, the applet issue processing unit 111 installs the applet 181A as the electronic ticket using the transmitted log as necessary.

In steps S255 and S237, the applet issue processing unit 111 registers, as the deletion trigger rule 172A, a trigger corresponding to a condition for deleting the installed applet 181A as the installed electronic ticket in the management applet 91 by controlling the communication unit 105.

In a case where a trigger corresponding to a behavior of the user is a trigger at the time of installation of an applet as an electronic ticket, the applet as the electronic ticket is installed by the process described above. For example, a process for managing entrance into an event site can be achieved by performing a process in cooperation with the management device 34 via the R/W 33 provided at a gate of the event site using the installed applet as the electronic ticket.

<Electronic Ticket Deleting Process>

Figure 12:
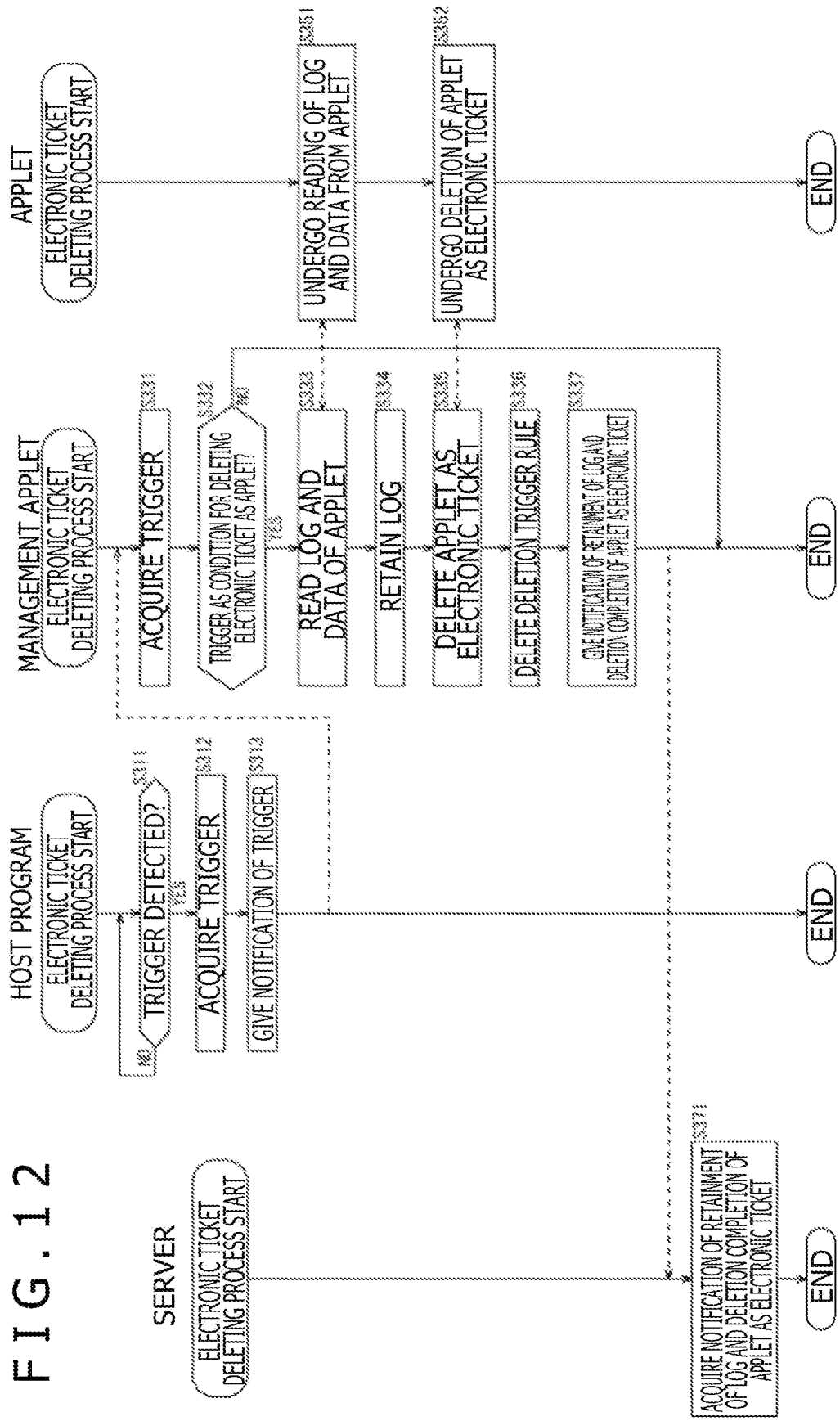
FIG. 12 is a flowchart explaining an electronic ticket deleting process.

An electronic ticket deleting process for deleting the applet 181A as an electronic ticket installed by the electronic ticket issuing process in FIG. 11 will be subsequently described with reference to a flowchart in FIG. 12.

In step S311, the trigger acquisition unit 151A of the host program 61A determines whether or not at least any item of information recognizable as triggers, such as position information received from an external trigger device 131A, time information or elapsed-time information received from the internal trigger detection unit 152, and operation information generated by an operation of the input unit 52 or the like, has been detected as a trigger, and repeats a similar process until supply of any one of these.

In a case where any one of the triggers has been detected in step S311, the process proceeds to step S312.

In step S312, the trigger acquisition unit 151A acquires the detected trigger.

In step S313, the trigger acquisition unit 151A supplies the acquired trigger to the management applet 91A of the secure element 58A.

In step S331, the management applet 91A acquires information associated with the trigger supplied from the trigger acquisition unit 151.

In step S332, the management applet 91A determines whether or not the information associated with trigger corresponds a condition for deleting the applet 181A as the electronic ticket with reference to the deletion trigger rule 172A for the acquired information associated with the trigger.

In a case where the acquired information associated with the trigger is not the trigger corresponding to the condition for deleting the applet as the electronic ticket in step S332, the process ends.

Moreover, in a case where the acquired trigger information is the trigger corresponding to the condition for deleting the applet as the electronic ticket in step S332, the process proceeds to step S333.

In steps S333 and S351, the management applet 91A reads a log and data from the installed applet 181 as the electronic ticket.

In step S334, the management applet 91A retains the log read from the applet 181 as the electronic ticket.

In steps S335 and S352, the management applet 91A deletes the applet 181A as the electronic ticket. While the applet 181A as the electronic ticket is deleted herein, the information left as the log registered in the deletion trigger rule 172A is not deleted. For example, the information left as the log herein is information indicating a point given in accordance with the number of times of purchase of the electronic ticket, discount information, or the like.

In step S336, the management applet 91A deletes the deletion trigger rule 172A where the trigger as the condition for deleting the deleted applet 181A as the electronic ticket has been registered.

In step S337, the management applet 91A notifies the server 32A of retainment of the log and completion of deletion of the applet 181A via the host program 61A.

In step S371, the applet issue processing unit 111 of the server 32A receives a notification indicating retainment of the log transmitted from the management applet 91A of the electronic apparatus 31A and completion of deletion of the applet 181A as the electronic ticket.

In a case where a trigger detected in accordance with a behavior of the user is a trigger as a condition for deleting an installed applet as an electronic ticket in conformity with a trigger rule, the applet as the electronic ticket is deleted, and a log associated with a point given by purchasing the electronic ticket, discount information, or the like is retained, for example, by the process described above.

In this manner, the installed applet as the electronic ticket is deleted by the trigger detected in accordance with the behavior of the user. Accordingly, deletion of an unnecessary applet as the electronic ticket is achievable without the necessity of consciously deleting the used applet as the electronic ticket by the user.

Moreover, at the time of re-installation (purchase) of the applet as the electronic ticket, information associated with the log necessary for giving a point or discount is retained, for example. Accordingly, point grant and discount based on the retained log can be achieved.

As a result, flexible use of the limited storage region within the secure element 58 is achievable.

<Case of Applet as Administration ID>

An example described next will be a case of an applet constituting an administration ID used in an administrative organ or the like.

Figure 13:
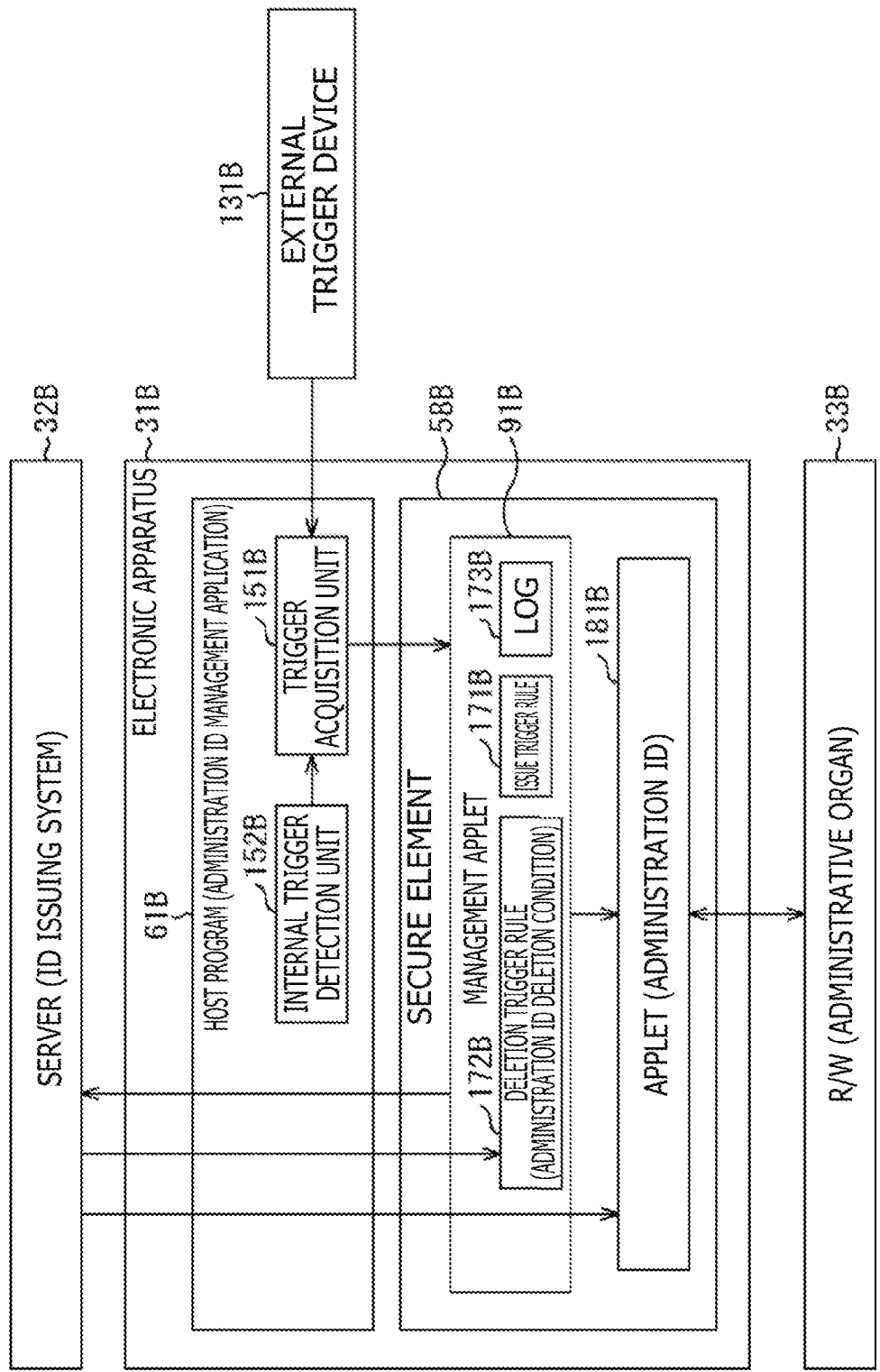
FIG. 13 is a diagram explaining an operation for installing an applet as an administration ID.

Specifically, in this case, the server 32 is constituted by a server 32B functioning as an ID issuing system as depicted in FIG. 13.

Moreover, for example, the electronic apparatus 31 is constituted by an electronic apparatus 31B carried by the user when disclosure of personal information is required by an administrative organ.

The electronic apparatus 31B herein includes a host program 61B and a secure element 58B.

The host program 61B herein represents a form of the host program 61 functioning as an administration ID management application (application program), and has a basic function similar to that of the host program 61.

Moreover, the host program 61B includes a trigger acquisition unit 151B and an internal trigger detection unit 152B. The trigger acquisition unit 151B and the internal trigger detection unit 152B have basic functions similar to those of the trigger acquisition unit 151 and the internal trigger detection unit 152, respectively.

Furthermore, the management applet 91B represents a form for managing an applet 181B as a form in a case where the applet 181 functions as an administration ID, and has a basic function similar to that of the management applet 91.

Specifically, for example, when a trigger detected on the basis of position information associated with the electronic apparatus 31B is such a trigger that the user carrying the electronic apparatus 31B is present within a predetermined distance from the position of the administrative organ, the trigger acquisition unit 151B acquires the detected trigger, and supplies the trigger to the management applet 91B.

The management applet 91B determines whether or not the detected trigger is the trigger as a condition for requesting issue of the administration ID with reference to the issue trigger rule 171B for the detected trigger.

For example, as the trigger corresponding to the condition for requesting issue of the applet as the administration ID, such a trigger that the user carrying the electronic apparatus 31B is present within a predetermined distance from the position of the administrative organ is registered in the issue trigger rule 171B.

Accordingly, in a case where the supplied trigger is a trigger as position information indicating that the user carrying the electronic apparatus 31B is present within the predetermined distance from the position of the administrative organ, and is registered in the issue trigger rule 171B, the management applet 91B requests the server 32B to issue the administration ID, and installs the applet 181B as the administration ID as indicated by a solid line in FIG. 13.

At this time, the management applet 91B registers information indicating a trigger as a condition for deleting the administration ID, i.e., a condition for deleting the applet 181B as the administration ID in the deletion trigger rule 172B.

For example, the condition for deleting the administration ID is that an elapsed time from installation of the applet 181B as the administration ID is longer than a predetermined time.

The issue trigger rule 171B herein represents a form at the time of storage of a condition for requesting issue of the administration ID as the issue trigger rule 171, and has a basic function similar to that of the issue trigger rule 171. Moreover, the deletion trigger rule 172B herein represents a form at the time of storage of a condition for deleting the administration ID as the deletion trigger rule 172, and has a basic function similar to that of the deletion trigger rule 172.

When the applet 181B as the administration ID is installed in the secure element 58B, the applet 181B is read by the R/W 33A equipped in the administrative organ. If the applet 181B is recognized as a proper administration ID by the management device 34 of the administrative organ, for example, disclosure of personal information is allowed for the user carrying the electronic apparatus 31A.

Figure 14:
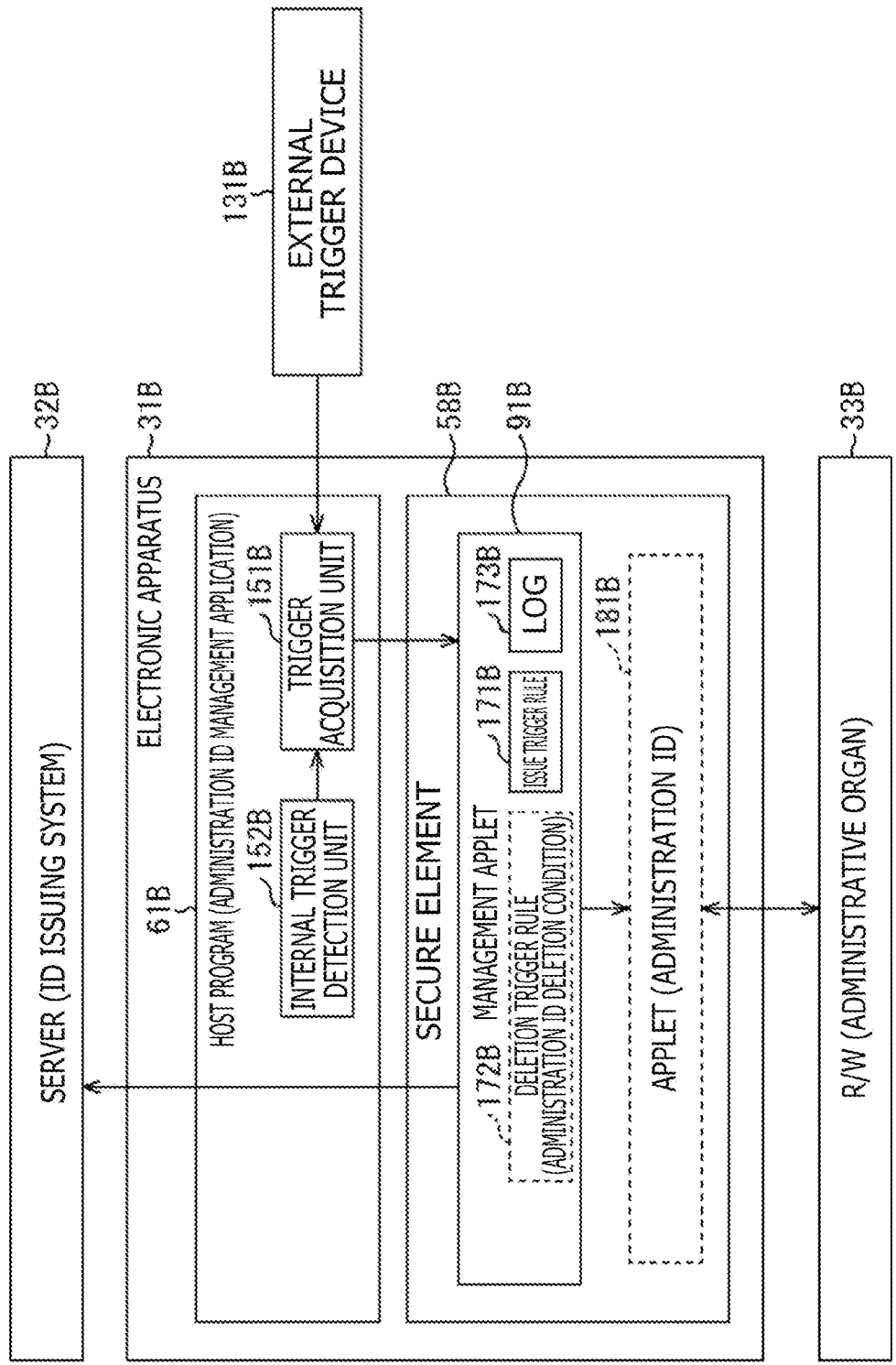
FIG. 14 is a diagram explaining an operation for deleting an applet as an administration ID.

Moreover, when it is indicated that the elapsed time from installation of the applet 181B as the administration ID, which is a time meeting the condition for deleting the administration ID and detected by the internal trigger detection unit 152B described above, is a predetermined time, the management applet 91B considers detection of information indicating this elapsed time as a trigger, and deletes the applet 181B as the installed administration ID as indicated by a dotted line in FIG. 14.

At this time, the management applet 91B also deletes the deletion trigger rule 172B where the trigger as the condition for deleting the administration ID has been registered as indicated by a dotted line in FIG. 14.

When the user approaches the administrative organ, the applet as the administration ID is installed by the series of processes described above, on the basis of this position information as a trigger. In addition, at the time of detection of information indicating that the elapsed time from installation of the applet is longer than the predetermined time, the applet as the administration ID is deleted on the basis of detection of this elapsed time information as a trigger.

As a result, the applet as the administration ID registered in the storage region of the secure element can be installed or deleted in accordance with the behavior of the user. Accordingly, flexible use of the storage region of the secure element is achievable.

<Administration ID Issuing Process>

Figure 15:
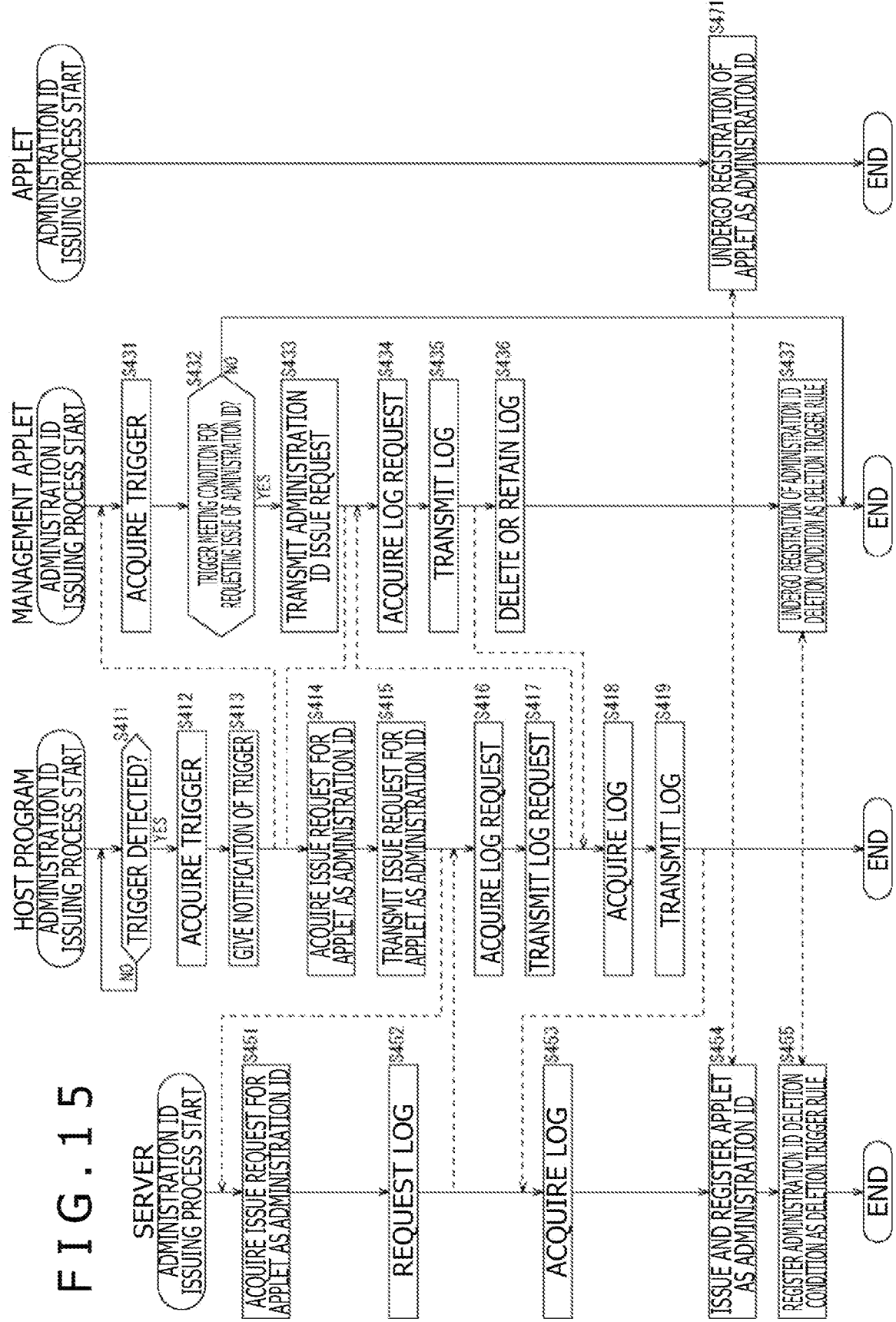
FIG. 15 is a flowchart explaining an administration ID issuing process.

An administration ID issuing process for installing the applet 181B as the administration ID used by the administrative organ for identifying the user will be subsequently described with reference to a flowchart in FIG. 15.

In step S411, the trigger acquisition unit 151B of the host program 61B determines whether or not at least any item of information recognizable as triggers, such as position information received from an external trigger device 131B, time information or elapsed-time information received from the internal trigger detection unit 152, and operation information generated by an operation of the input unit 52 or the like, has been detected as a trigger, and repeats a similar process until detection of any one of these.

In a case where the trigger acquisition unit 151B detects any one of the triggers in step S411, the process proceeds to step S412.

In step S412, the trigger acquisition unit 151B acquires the detected trigger.

In step S413, the trigger acquisition unit 151B supplies the acquired trigger to the management applet 91B of the secure element 58B.

In step S431, the management applet 91B acquires information associated with the trigger supplied from the trigger acquisition unit 151B.

In step S432, the management applet 91B determines whether or not the trigger corresponds a condition for issuing the applet as the administration ID with reference to the issue trigger rule 171B for the acquired information associated with the trigger.

In a case where the acquired information associated with the trigger is not the trigger corresponding to the condition for issuing the applet as the administration ID in step S432, the process ends.

Moreover, in a case where the acquired information associated with the trigger is the trigger corresponding to the condition for issuing the applet as the administration ID in step S432, the process proceeds to step S433.

In step S433, the management applet 91B requests the host program 61B to issue the applet as the administration ID.

In step S414, the host program 61B acquires the request for issuing the applet as the administration ID from the management applet 91B.

In step S415, the host program 61B requests the server 32B to issue the applet as the administration ID by controlling the communication unit 55.

In step S451, the applet issue processing unit 111 of the control unit 101 of the server 32B acquires the request for issuing the applet as the administration ID from the electronic apparatus 31B by controlling the communication unit 105.

In step S452, the applet issue processing unit 111 requests the electronic apparatus 31B to generate a log, which is information re-used at the time of use of the applet as the administration ID requested to be issued, by controlling the communication unit 105.

For example, the log herein is information indicating a history of use of personal information or the like disclosed on the basis of the administration ID, in addition to information associated with each issue time and date previously obtained.

In step S416, the host program 61B acquires the log request from the server 32B via the communication unit 55.

In step S417, the host program 61B notifies the management applet 91B included in the secure element 58B of the log request received from the server 32B.

In step S434, the management applet 91B acquires the log request from the server 32B via the host program 61B.

In step S435, the management applet 91B reads information stored in the log and associated with the applet as the administration ID requested to be issued, and transmits the read information to the host program 61B in response to the log request.

In step S436, the management applet 91B retains information indicating the issue time and date and the use history, for example, and corresponding to the log requested to be issued, as the applet for the administration ID.

On the other hand, in step S418, the host program 61B acquires the log transmitted from the management applet 91B.

In step S419, the host program 61B transmits information associated with the log transmitted from the management applet 91B to the server 32B by controlling the communication unit 55.

In step S453, the applet issue processing unit 111 of the server 32B acquires the transmitted log by controlling the communication unit 105.

In steps S454 and S471, the applet issue processing unit 111 installs the applet 181B as the administration ID in the secure element 58B of the electronic apparatus 31B by controlling the communication unit 105. At this time, the applet issue processing unit 111 installs the applet 181B as the administration ID using the transmitted log as necessary.

In steps S455 and S437, the applet issue processing unit 111 registers information associated with a trigger as a condition for deleting the installed applet 181B as the administration ID in the deletion trigger rule 172B of the management applet 91B by controlling the communication unit 105.

In a case where a trigger corresponding to a behavior of the user is a trigger at the time of installation of an applet as an administration ID, the applet as the administration ID is installed by the process described above. For example, when the administration ID is recognized as a proper administration ID, a process for disclosing personal information can be achieved by presenting the administration ID to the management device 34 via the R/W 33 equipped in the administrative organ using the installed applet as the administration ID.

<Administration ID Deleting Process>

Figure 16:
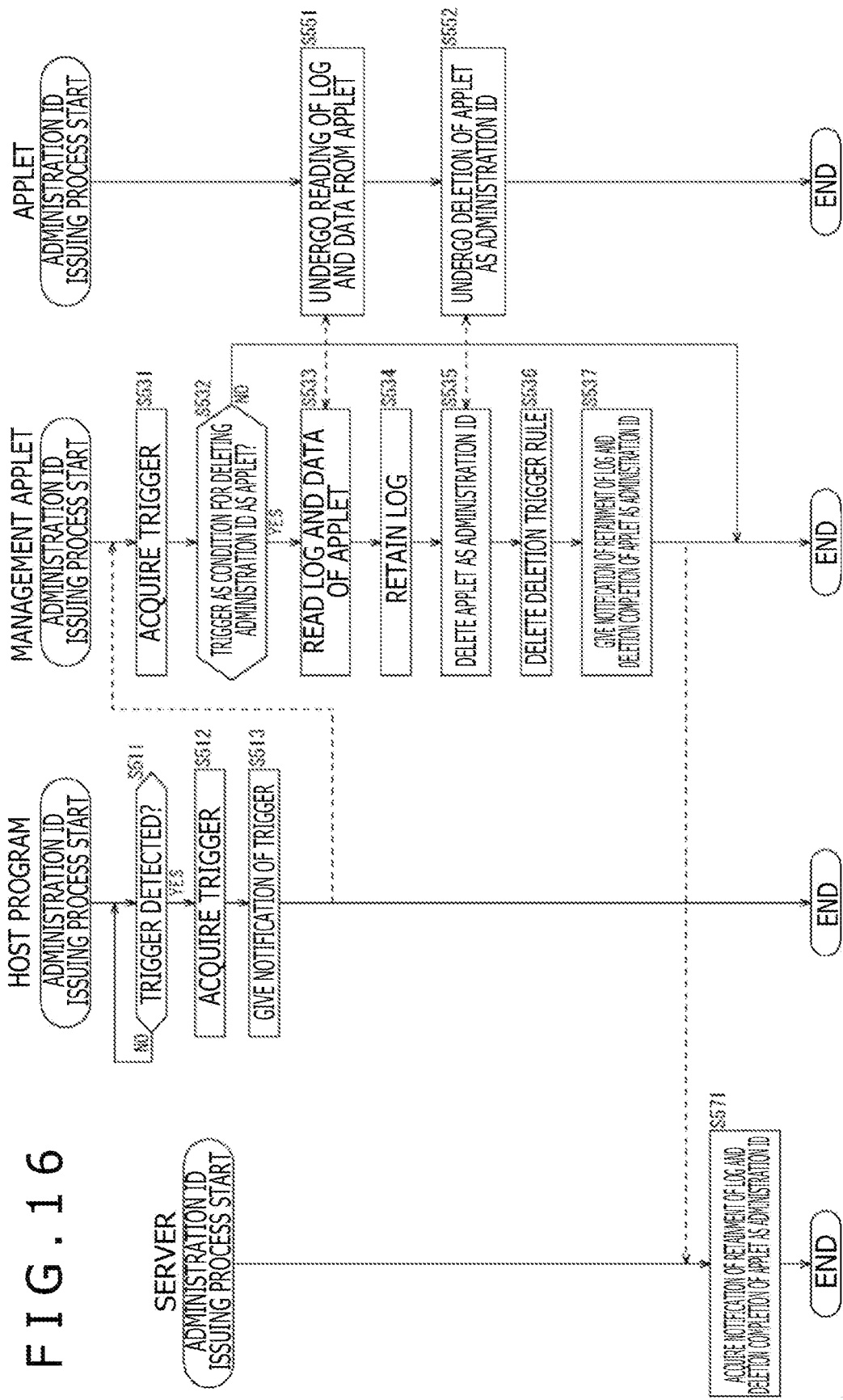
FIG. 16 is a flowchart explaining an administration ID deleting process.

A deleting process for deleting the applet 181B as an administration ID installed by the administration ID issuing process in FIG. 15 will be subsequently described with reference to a flowchart in FIG. 16.

In step S511, the trigger acquisition unit 151B of the host program 61B determines whether or not at least any item of information recognizable as triggers, such as position information received from the external trigger device 131B, time information or elapsed-time information received from the internal trigger detection unit 152B, and operation information generated by an operation of the input unit 52 or the like, has been detected as a trigger, and repeats a similar process until supply of any one of these.

In a case where any one of the triggers has been detected in step S511, the process proceeds to step S512.

In step S512, the trigger acquisition unit 151 acquires the detected trigger.

In step S513, the trigger acquisition unit 151 supplies the acquired trigger to the management applet 91B of the secure element 58B.

In step S531, the management applet 91B acquires information associated with the trigger supplied from the trigger acquisition unit 151B.

In step S532, the management applet 91B determines whether or not the trigger corresponds to a trigger as a condition for deleting the applet as the administration ID with reference to the deletion trigger rule 172B for the acquired information associated with the trigger.

In a case where the acquired information associated with the trigger is not the trigger corresponding to the condition for deleting the applet as the administration ID in step S532, the process ends.

Moreover, in a case where the acquired information associated with the trigger is the trigger corresponding to the condition for deleting the applet as the administration ID in step S532, the process proceeds to step S533.

In steps S533 and S551, the management applet 91B reads a log and data from the installed applet 181B as the administration ID.

In step S534, the management applet 91B retains the log read from the applet 181 as the administration ID.

In steps S535 and S552, the management applet 91B deletes the applet 181B as the administration ID.

In step S536, the management applet 91B deletes the deletion trigger rule 172B where the trigger as the condition for deleting the deleted applet 181B as the administration ID has been registered.

In step S537, the management applet 91B notifies the server 32B of retainment of the log and completion of deletion of the applet 181B as the administration ID via the host program 61B.

In step S571, the applet issue processing unit 111 of the server 32B receives a notification indicating retainment of the log transmitted from the management applet 91B of the electronic apparatus 31B and completion of deletion of the applet 181B as the administration ID.

In a case where a trigger detected as a result of a behavior of the user is a trigger as a condition for deleting an installed applet as an administration ID in conformity with a trigger rule, the applet as the administration ID is deleted, and a log such as information associated with an issue time and date and a use history of the administration ID is retained, for example, by the process described above.

In this manner, the installed applet as the administration ID is deleted by the trigger detected in accordance with the behavior of the user. Accordingly, deletion of an unnecessary applet as an administration ID is achievable without the necessity of consciously deleting the applet as the administration ID by the user.

Moreover, at the time of re-installation of the applet as the administration ID, information associated with the log, such as an issue time and date and a use history, is retained. Accordingly, disclosure of information can be smoothly achieved on the basis of the retained log when the applet as the administration ID is re-installed.

As a result, flexible use of the limited storage region within the secure element 58 is achievable.

<Case of Applet as Transportation Electronic Pass>

Described next will be an example of a case of an applet constituting a transportation electronic pass used in a transportation system or the like.

Note that the description is presented herein on an assumption that there exist an A transportation electronic pass effective in a transportation system in country A, and a B transportation electronic pass in a transportation system in country B. It is assumed that the A transportation electronic pass is effective in the transportation system in country A, and that the B transportation electronic pass is effective in the transportation system in country B. The example described herein will be a case of the A transportation electronic pass used in the transportation system in country A.

Figure 17:
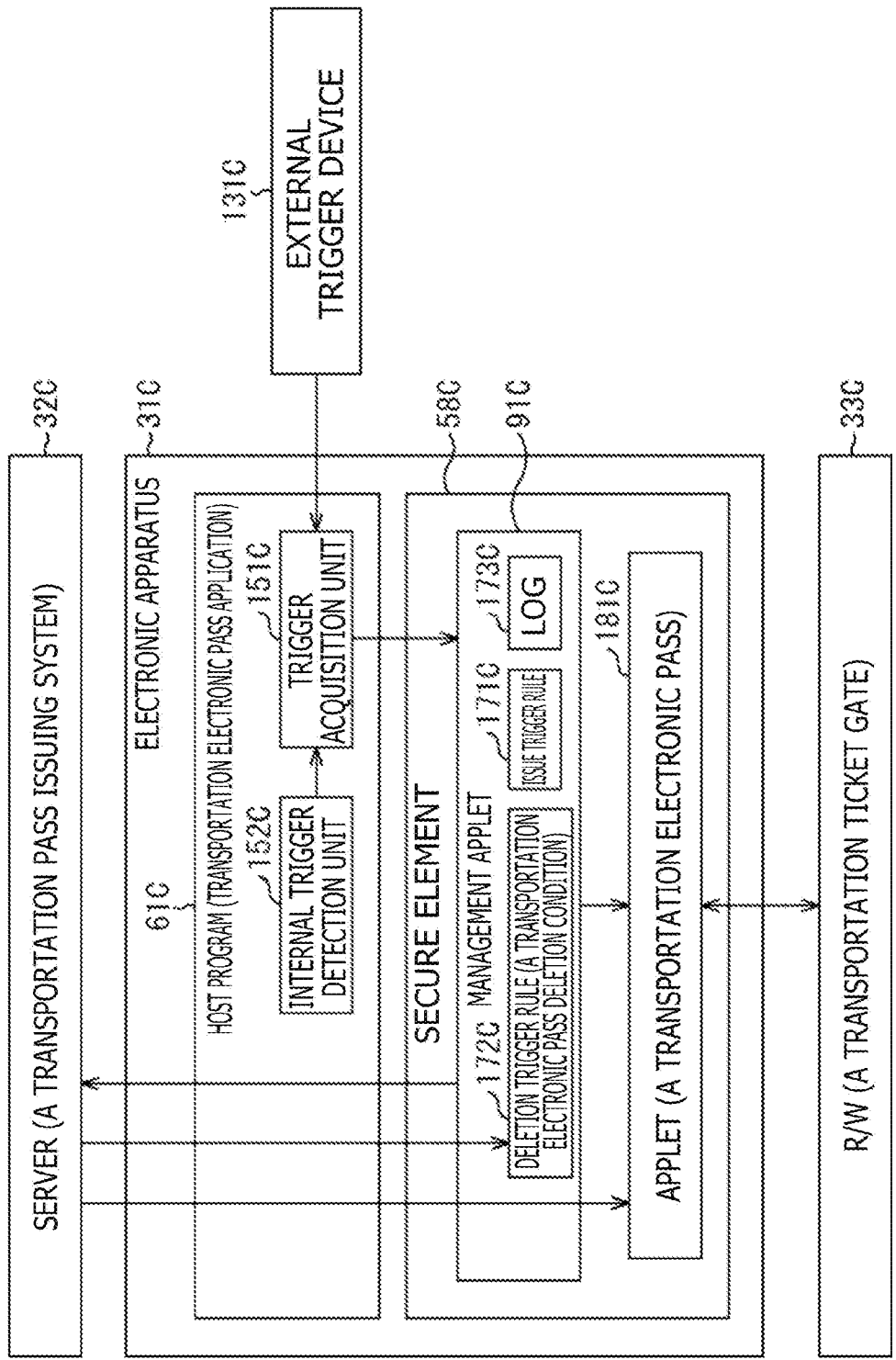
FIG. 17 is a diagram explaining an operation for installing an applet as a transportation electronic pass.

Specifically, in this case, the server 32 is constituted by a server 32C functioning as an A transportation electronic pass issuing system as depicted in FIG. 17, for example.

Moreover, for example, the electronic apparatus 31 is constituted by an electronic apparatus 31C carried by the user at the time of use as an electronic transportation pass in the transportation system.

The electronic apparatus 31C herein includes a host program 61C and a secure element 58C.

The host program 61C herein represents a form of the host program 61 functioning as a transportation electronic pass application (application program), and has a basic function similar to that of the host program 61.

Moreover, the host program 61C includes a trigger acquisition unit 151C and an internal trigger detection unit 152C. The trigger acquisition unit 151C and the internal trigger detection unit 152C have basic functions similar to those of the trigger acquisition unit 151 and the internal trigger detection unit 152, respectively.

Furthermore, the management applet 91C represents a form for managing an applet 181C indicating a form in a case where the applet 181 functions as the A transportation electronic pass, and has a basic function similar to that of the management applet 91.

Specifically, for example, when detected on the basis of position information associated with the electronic apparatus 31C is such a trigger that the user carrying the electronic apparatus 31B is present in country A, the trigger acquisition unit 151C acquires the detected trigger, and supplies the trigger to the management applet 91C.

The management applet 91C determines whether or not the detected trigger is a trigger as a condition for requesting issue of the applet as the A transportation electronic pass with reference to the issue trigger rule 171C for the detected trigger.

For example, as the trigger corresponding to the condition for requesting issue of the applet as the A transportation electronic pass, a trigger that the user carrying the electronic apparatus 31C is present in country A is registered in the issue trigger rule 171C.

Accordingly, when the supplied trigger is a trigger as position information indicating that the user carrying the electronic apparatus 31B is present in country A, and is registered in the issue trigger rule 171C, the management applet 91C requests the server 32C to issue the applet as the A transportation electronic pass, and installs the applet 181C as the A transportation electronic pass indicated by a solid line in FIG. 17.

At this time, the management applet 91C registers information associated with a trigger as a condition for deleting the A transportation electronic pass, i.e., a condition for deleting the applet 181C as the A transportation electronic pass in the deletion trigger rule 172C.

For example, the condition for deleting the A transportation electronic pass is position information indicating a position outside country A.

The issue trigger rule 171C herein represents a form at the time of storage of a condition for requesting issue of the A transportation electronic pass as the issue trigger rule 171, and has a basic function similar to that of the issue trigger rule 171. Moreover, the deletion trigger rule 172C herein represents a form at the time of storage of a condition for deleting the A transportation electronic pass as the deletion trigger rule 172, and has a basic function similar to that of the deletion trigger rule 172.

When the applet 181C as the A transportation electronic pass is installed in the secure element 58C, the applet 181C is read by the R/W 33C equipped at a ticket gate of the transportation system. If the applet 181C is recognized as a proper A transportation electronic pass by the management device 34 of the transportation system, for example, entrance into a station yard is allowed for the user carrying the electronic apparatus 31C.

Figure 18:
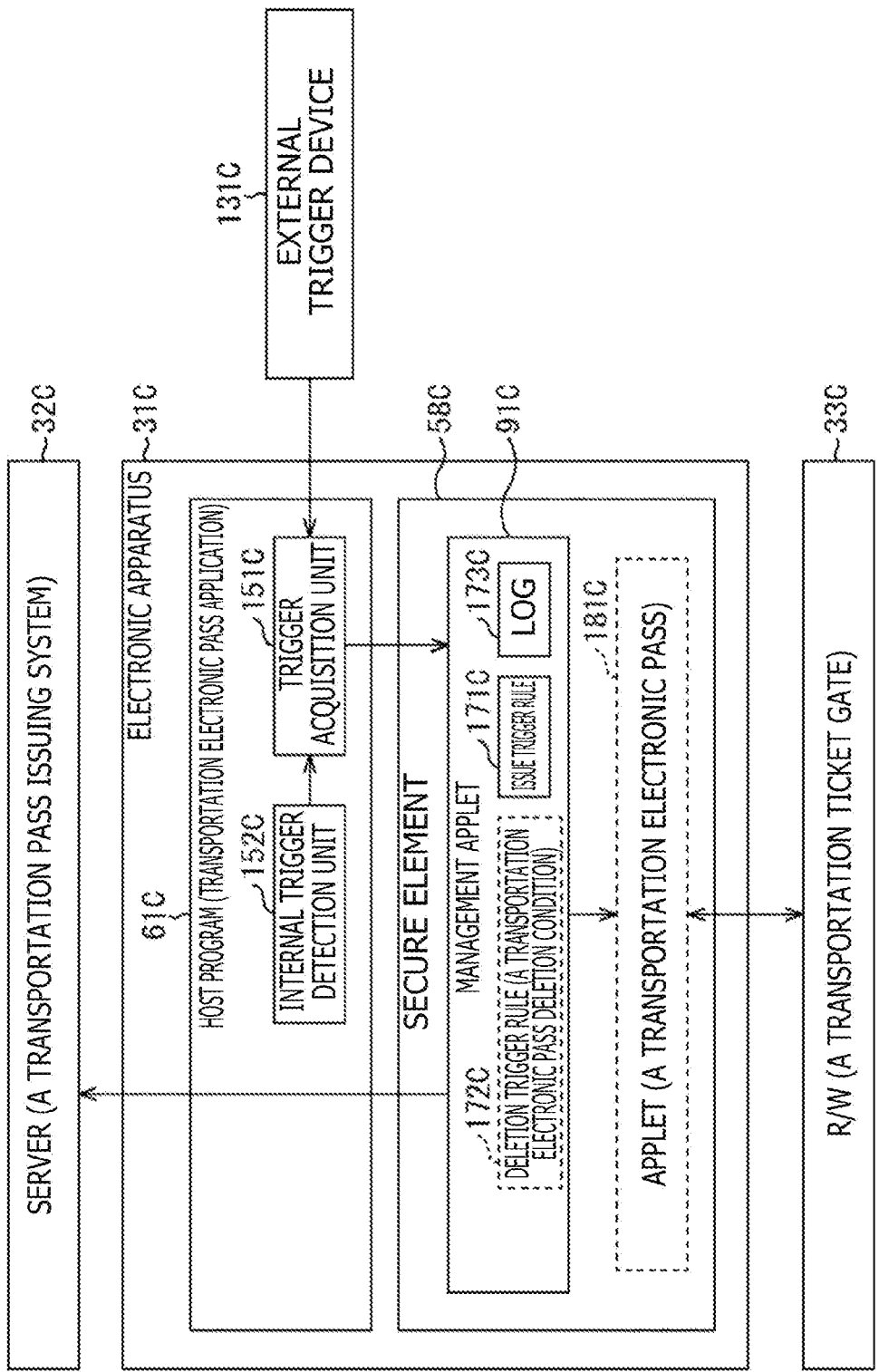
FIG. 18 is a diagram explaining an operation for deleting an applet as a transportation electronic pass.

Moreover, when it is indicated that position information meeting the condition for deleting the A transportation electronic pass and detected by the external trigger device 131A described above indicates a position outside country A, the management applet 91C considers detection of the position information as a trigger, and deletes the installed applet 181C as the A transportation electronic pass as indicated by a dotted line in FIG. 18.

At this time, the management applet 91C also deletes the deletion trigger rule 172C as the condition for deleting the A transportation electronic pass as indicated by a dotted line in FIG. 18.

When the user enters country A, the applet as the A transportation electronic pass is installed by the series of processes described above, on the basis of this position information as a trigger. In addition, at the time of detection of position information indicating a position outside country A, the applet as the A transportation electronic pass is deleted on the basis of detection of this position information as a trigger.

As a result, the applet as the A transportation electronic pass registered in the storage region of the secure element can be installed or deleted in accordance with a behavior of the user. Accordingly, flexible use of the storage region of the secure element is achievable.

<Transportation Electronic Pass Issuing Process>

Figure 19:
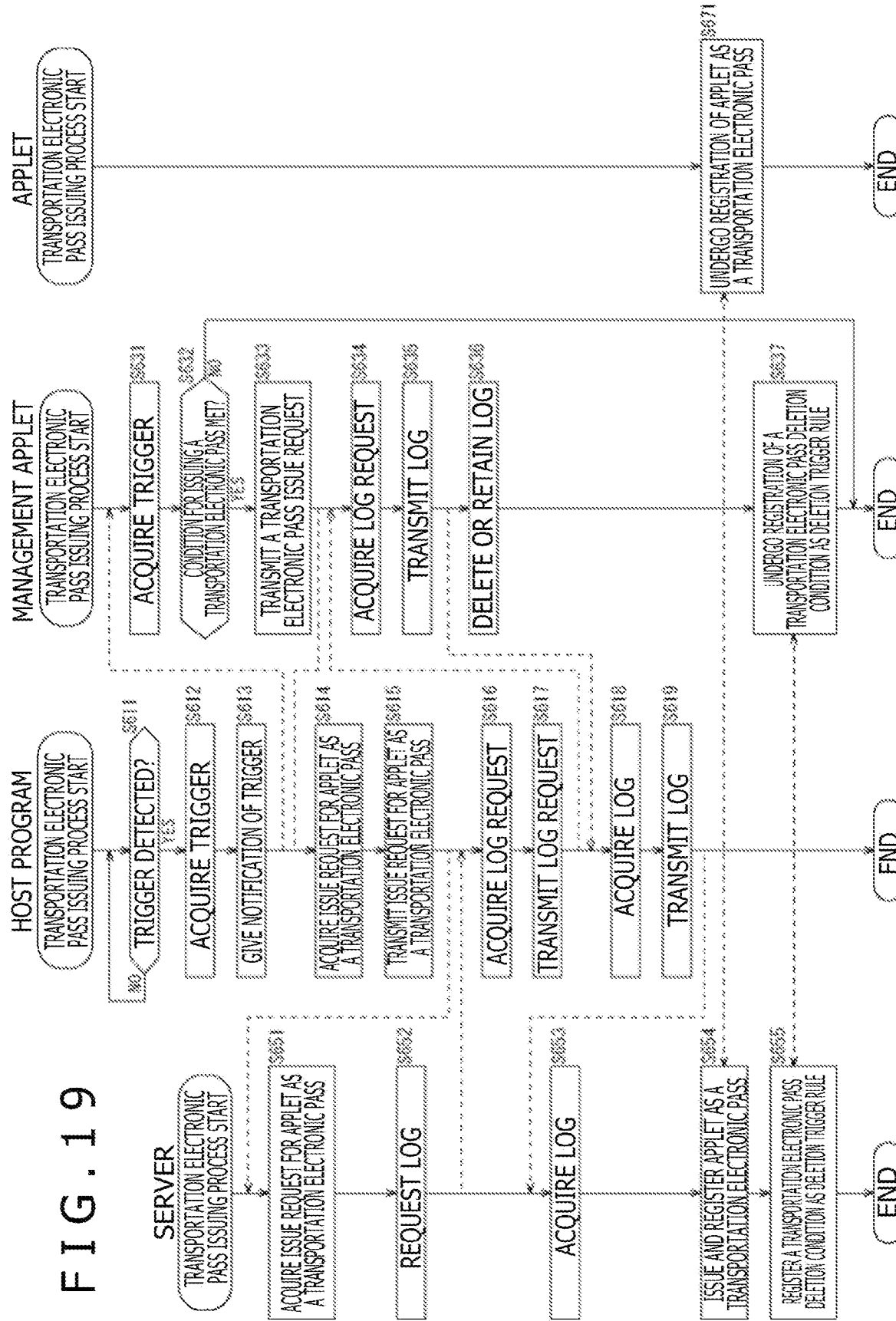
FIG. 19 is a flowchart explaining a transportation electronic pass issuing process.

Described next with reference to a flowchart in FIG. 19 will be a transportation electronic pass issuing process performed in a case where the applet 181 is the A transportation electronic pass as an example of the applet 181.

In step S611, the trigger acquisition unit 151C of the host program 61C determines whether or not at least any item of information recognizable as triggers, such as position information received from an external trigger device 131C, time information or elapsed-time information received from the internal trigger detection unit 152C, and operation information generated by an operation of the input unit 52 or the like, has been detected as a trigger, and repeats a similar process until supply of any one of these.

In a case where the trigger acquisition unit 151C detects any one of the triggers in step S611, the process proceeds to step S612.

In step S612, the trigger acquisition unit 151C acquires information associated with the detected trigger.

In step S613, the trigger acquisition unit 151C supplies the acquired information associated with the trigger to the management applet 91C of the secure element 58C.

In step S631, the management applet 91C acquires the information associated with the trigger supplied from the trigger acquisition unit 151C.

In step S632, the management applet 91C determines whether or not the trigger corresponds a condition for issuing the applet as the A transportation electronic pass with reference to the issue trigger rule 171C for the acquired information associated with the trigger.

In a case where the acquired information associated with the trigger is not the trigger corresponding to the condition for issuing the applet as the A transportation electronic pass in step S632, the process ends.

Moreover, in a case where the acquired information associated with the trigger is the trigger corresponding to the condition for issuing the applet as the A transportation electronic pass in step S632, the process proceeds to step S633.

In step S633, the management applet 91C requests the host program 61C to issue the applet as the A transportation electronic pass.

In step S614, the host program 61C acquires the request for issuing the applet as the A transportation electronic pass from the management applet 91C.

In step S615, the host program 61C requests the server 32C to issue the applet as the A transportation electronic pass by controlling the communication unit 55.

In step S651, the applet issue processing unit 111 of the control unit 101 of the server 32C acquires the request for issuing the applet as the A transportation electronic pass from the electronic apparatus 31C by controlling the communication unit 105.

In step S652, the applet issue processing unit 111 requests the electronic apparatus 31C to generate a log, which is information re-used at the time of use of the applet as the A transportation electronic pass requested to be issued, by controlling the communication unit 105.

For example, the log herein is a charge amount available as the A transportation electronic pass, a commuter pass, information indicating a use history, or the like.

In step S616, the host program 61C acquires the log request from the server 32C via the communication unit 55.

In step S617, the host program 61C notifies the management applet 91C included in the secure element 58C of the log request received from the server 32C.

In step S634, the management applet 91C acquires the log request from the server 32C via the host program 61C.

In step S635, the management applet 91C reads information stored in the log and associated with the applet as the A transportation electronic pass requested to be issued, and transmits the read information to the host program 61C in response to the log request.

In step S636, the management applet 91C retains the log requested to be issued, such as a charge amount and a commuter pass available as the A transportation electronic pass, and information indicating a use history, as the applet corresponding to the A transportation electronic pass.

On the other hand, in step S618, the host program 61C acquires the log transmitted from the management applet 91C.

In step S619, the host program 61C transmits information associated with the log transmitted from the management applet 91C to the server 32C by controlling the communication unit 55.

In step S653, the applet issue processing unit 111 of the server 32C acquires the transmitted log by controlling the communication unit 105.

In steps S654 and S671, the applet issue processing unit 111 installs the applet 181C as the A transportation electronic pass in the secure element 58 of the electronic apparatus 31C by controlling the communication unit 105.

In steps S655 and S637, the applet issue processing unit 111 registers information associated with a trigger of a condition for deleting the installed applet 181C as the A transportation electronic pass in the deletion trigger rule 172C of the management applet 91C by controlling the communication unit 105.

In a case where a trigger corresponding to a behavior of the user is the trigger at the time of installation of the applet as the A transportation electronic pass, the applet as the A transportation electronic pass is installed by the process described above. For example, a process for managing opening and closing of a ticket gate is achievable on the basis of the installed applet as the A transportation electronic pass by performing a process in cooperation with the management device 34 via the R/W 33 equipped at the ticket gate of a transportation system, for example.

Described above has been the process for issuing the applet as the A transportation electronic pass. However, when position information indicates that the B transportation electronic pass is present in country B, the B transportation electronic pass is installed as an applet in a similar manner.

<Transportation Electronic Pass Deleting Process>

Figure 20:
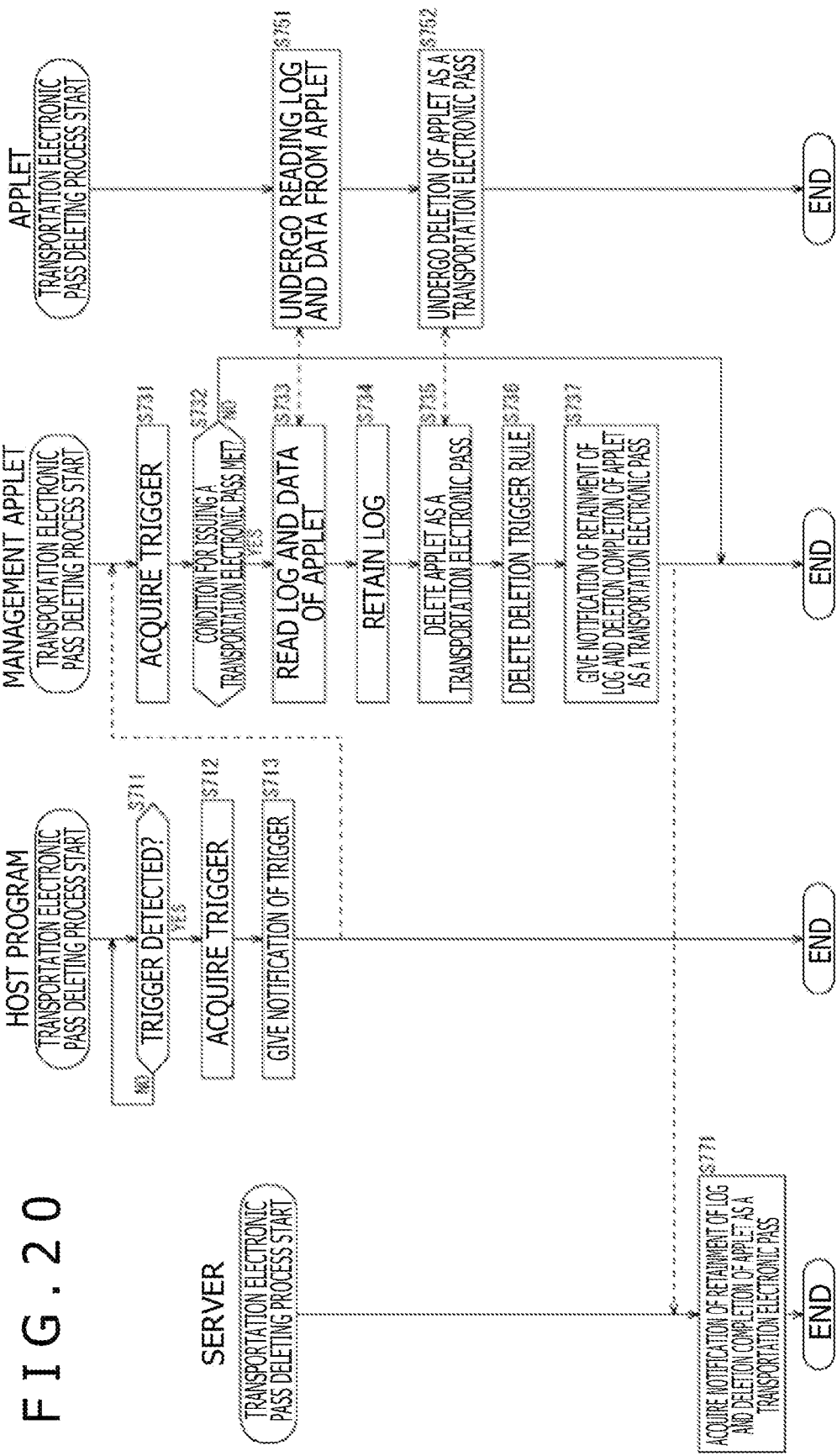
FIG. 20 is a flowchart explaining a transportation electronic pass deleting process.

Subsequently described with reference to a flowchart in FIG. 20 will be a transportation electronic pass deleting process for deleting the applet as the A transportation electronic pass installed by the issuing process for issuing the applet as the A transportation electronic pass in FIG. 20.

In step S711, the trigger acquisition unit 151C of the host program 61C determines whether or not at least any item of information recognizable as triggers, such as position information received from an external trigger device 131C, time information or elapsed-time information received from the internal trigger detection unit 152C, and operation information generated by an operation of the input unit 52 or the like, has been detected as a trigger, and repeats a similar process until supply of any one of these.

In a case where any one of the triggers has been detected in step S711, the process proceeds to step S712.

In step S712, the trigger acquisition unit 151C acquires the detected trigger.

In step S713, the trigger acquisition unit 151C supplies the acquired trigger to the management applet 91C of the secure element 58C.

In step S731, the management applet 91C acquires the information associated with the trigger supplied from the trigger acquisition unit 151C.

In step S732, the management applet 91C determines whether or not the trigger corresponds to a trigger for deleting the applet as the A transportation electronic pass with reference to the deletion trigger rule 172C for the acquired information associated with the trigger.

For example, a trigger that detected position information does not indicate a position within country A is herein considered as a trigger for deleting the applet as the A transportation electronic pass.

In a case where the acquired information associated with the trigger is not the trigger corresponding to the condition for deleting the applet as the A transportation electronic pass in step S732, the process ends.

Moreover, in a case where the acquired information associated with the trigger is the trigger corresponding to the condition for deleting the applet as the A transportation electronic pass in step S732, the process proceeds to step S733.

In steps S733 and S751, the management applet 91C reads a log and data from the installed applet 181C as the A transportation electronic pass.

In step S734, the management applet 91C retains the log read from the applet 181C as the A transportation electronic pass.

In steps S735 and S752, the management applet 91C deletes the applet 181C as the A transportation electronic pass.

In step S736, the management applet 91C deletes the deletion trigger rule 172C where the trigger as the condition for deleting the deleted applet 181C as the A transportation electronic pass has been registered.

In step S737, the management applet 91C notifies the server 32C of retainment of the log and completion of deletion of the applet 181C as the A transportation electronic pass via the host program 61C.

In step S771, the applet issue processing unit 111 of the server 32C receives a notification indicating retainment of the log transmitted from the management applet 91C of the electronic apparatus 31C and completion of deletion of the applet 181C as the A transportation electronic pass.

In a case where a trigger detected as a result of a behavior of the user is a trigger of a condition for deleting the installed applet as the A transportation electronic pass in conformity with the deletion rule, the applet as the A transportation electronic pass is deleted, and a log such as a charge amount and a commuter pass available as the A transportation electronic pass, and information indicating a use history, is retained by the above process, for example.

In this manner, the installed applet as the A transportation electronic pass is deleted by the trigger detected in accordance with the behavior of the user. Accordingly, deletion of the unnecessary applet as the A transportation electronic pass is achievable without the necessity of consciously deleting the applet as the A transportation electronic pass by the user at timing of leaving country A.

Moreover, at the time of re-installation of the applet as the A transportation electronic pass, information associated with the log, such as a charge amount and a commuter pass available as the A transportation electronic pass, and information indicating a use history, is retained. Accordingly, the A transportation electronic pass based on the retained log can be smoothly used when the applet as the A transportation electronic pass is re-installed.

As a result, flexible use of the limited storage region within the secure element 58 is achievable.

Note that the B transportation electronic pass is deleted in a similar manner.

Accordingly, in a case of a shift from country A to country B after the A transportation electronic pass is installed for entrance into country A, the applet as the A transportation electronic pass is deleted at the time of leaving country A in accordance with the shift into country B. In addition, the B transportation electronic pass is installed in accordance with the presence in country B.

Thereafter, in a case of return from country B to country A, the applet as the B transportation electronic pass is deleted at the time of leaving country B in accordance with the shift into country A. In addition, the A transportation electronic pass is re-installed in accordance with the presence in country A.

2. Modifications

While the process achieved by the electronic apparatus 31 including the secure element 58 has been described above, this process may be practiced by a wearable device including a secure element, and an electronic apparatus capable of communicating with the wearable device.

Figure 21:
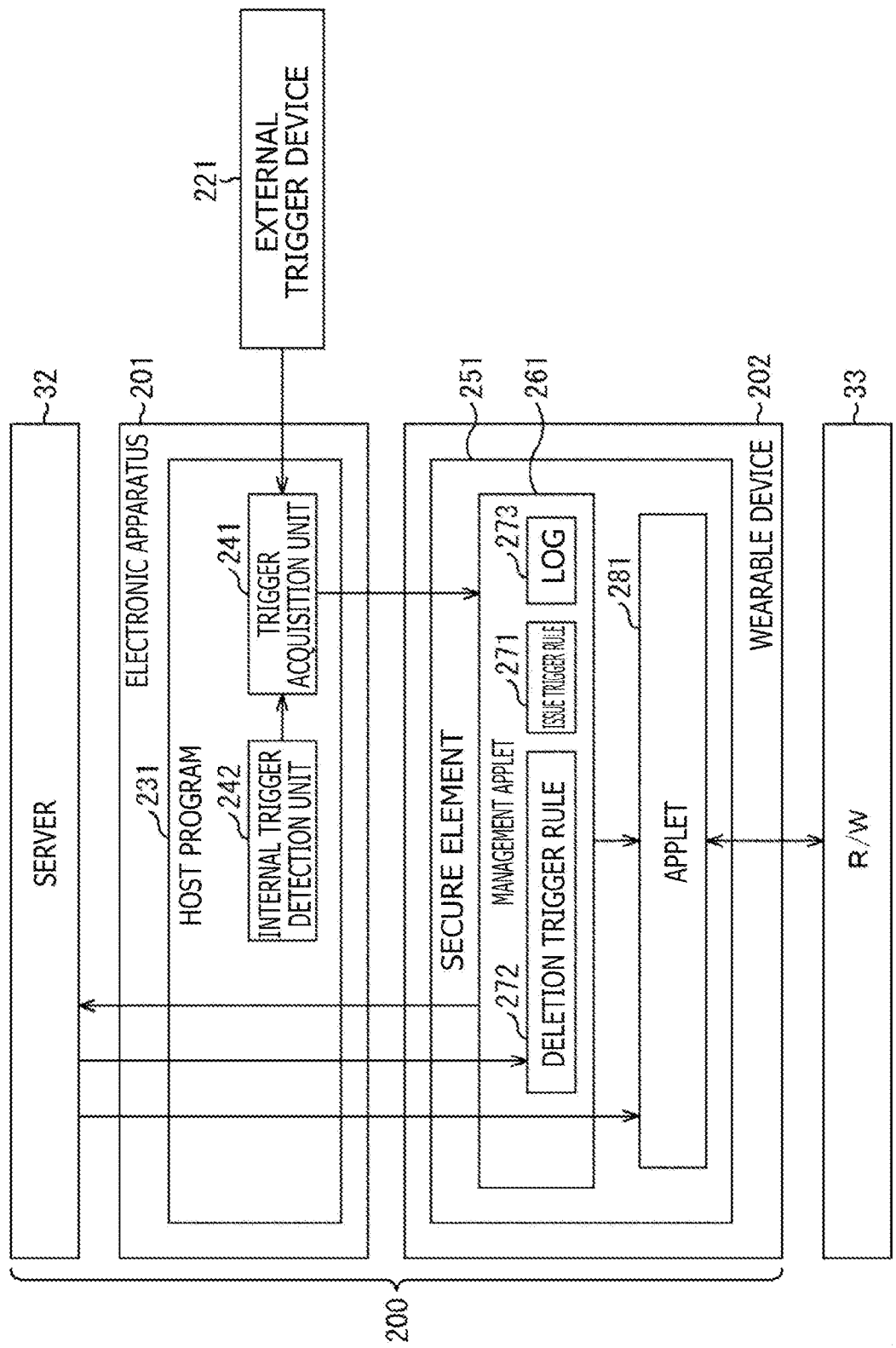
FIG. 21 is a diagram explaining an operation for installing an applet in a wearable device system.
Figure 22:
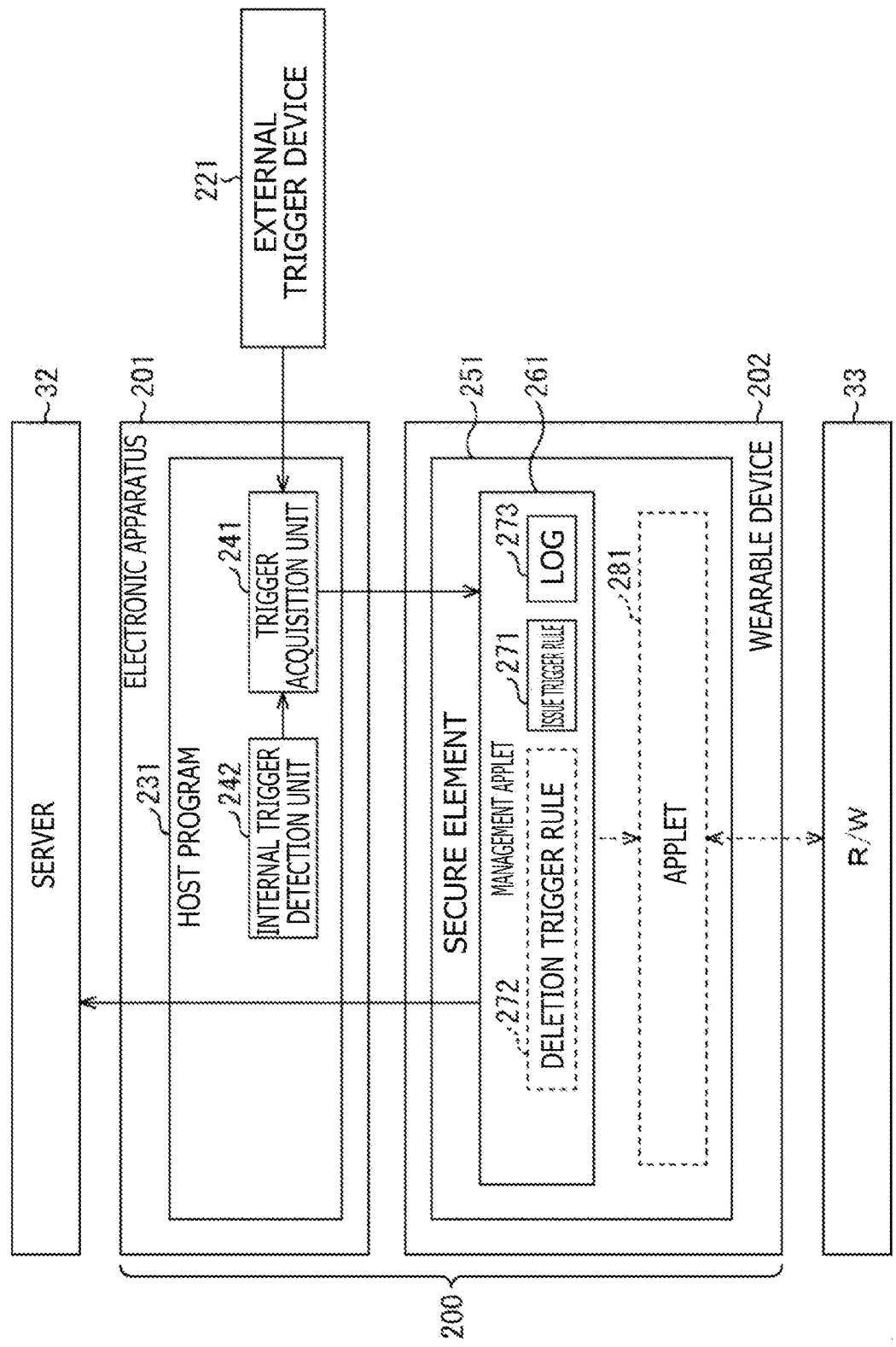
FIG. 22 is a diagram explaining an operation for deleting an applet in the wearable device system.

FIGS. 21 and 22 each depict a configuration example of a wearable device system achieved by a wearable device including a secure element, and an electronic apparatus capable of communicating with the wearable device.

A wearable device system 200 in FIGS. 21 and 22 is constituted by an electronic apparatus 201 and a wearable device 202, and configured such that the electronic apparatus 201 and the wearable device 202 communicate with each other by near field communication such as Bluetooth (registered trademark).

For example, the electronic apparatus 201 is constituted by a personal computer, a smartphone, or the like, and includes a trigger acquisition unit 241 and an internal trigger detection unit 242.

Note that the trigger acquisition unit 241 and the internal trigger detection unit 242 correspond to the trigger acquisition unit 151 and the internal trigger detection unit 152 in FIGS. 5 and 6, respectively. Accordingly, description of these components is omitted.

For example, the wearable device 202 is a smartwatch, a wristband, or the like, and attached to the user. Moreover, the wearable device 202 may have other forms attachable to the user, such as a ring type and a glove type. Furthermore, the wearable device 202 may be a device which has an electronic circuit formed on a cloth, and generates electricity in response to sweat, body temperature, or movement of a human body. In this case, the wearable device 202 may have a configuration of a device type constituted by cloths put on a body, such as a shirt and a jacket.

The wearable device 202 includes a management applet 261 and an applet 281. The management applet 261 stores an issue trigger rule 271 and a deletion trigger rule 272.

Note that the management applet 261 and the applet 281 correspond to the management applet 91 and the applet 81 in FIGS. 5 and 6, respectively. Accordingly, description of these components is omitted.

Specifically, as depicted in FIG. 21, when the trigger acquisition unit 241 acquires a trigger, this trigger is supplied to the management applet 261 of the wearable device 202.

The management applet 261 determines whether or not the supplied trigger is a trigger corresponding to a condition for installing the predetermined applet 281 with reference to the issue trigger rule 271 for the supplied trigger. In a case where the supplied trigger is the trigger corresponding to the condition for installing the predetermined applet 281, the management applet 261 requests the server 32 to issue the applet 281.

The server 32 issues the applet 281 in response to the request from the wearable device 202, transmits the applet 281 to the wearable device 202 via the electronic apparatus 201, and installs the applet 281 in the wearable device 202.

In this manner, the applet 281 is read from the wearable device 202 passed over the R/W 33, and a predetermined process is allowed to be executed.

Moreover, as depicted in FIG. 22, the management applet 261 determines whether or not the supplied trigger is a trigger corresponding to a condition for deleting the predetermined applet 281 with reference to the deletion trigger rule 272 for the supplied trigger. In a case where the supplied trigger is the trigger corresponding to the condition for deleting the predetermined applet 281, deletion is achieved as the applet 281 indicated by a dotted line in FIG. 22.

Specifically, an applet can be similarly installed or deleted on the basis of a trigger detected in accordance with a behavior of the user in the wearable device system 200. Accordingly, flexible use of the storage region of the secure element is achievable.

While the trigger acquisition unit 241 is provided on the electronic apparatus 201 in the wearable device system 200 in FIGS. 21 and 22 in the example described above, the trigger acquisition unit 241 may be provided on a configuration other than the electronic apparatus 201, such as the wearable device 202.

3. Example of Execution by Software

FIG. 23 depicts a configuration example of a general-purpose computer. This personal computer includes a built-in CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

An input unit 1006 constituted by an input device which receives input of an operation command from the user, such as a keyboard and a mouse, an output unit 1007 which outputs a processing operation screen and an image of a processing result to a display device, a storage unit 1008 constituted by a hard disk drive or the like for storing programs and various data, and a communication unit 1009 constituted by a LAN (Local Area Network) adapter or the like and executing a communication process via a network represented by the Internet are connected to the input/output interface 1005. Further connected is a drive 1010 which reads and writes data from and to a removable storage medium 1011 such as a magnetic disk (including flexible disk), an optical disk (CD-ROM (Compact Disc-Read Only Memory), a DVD (Digital Versatile Disc)), a magneto-optical disk (including MD (Mini Disc)), and a semiconductor memory.

The CPU 1001 executes various types of processes under programs stored in the ROM 1002, or programs read from the removable storage medium 1011 such as a magnetic disk, an optical disk, a magneto-optical disk, and a semiconductor memory, installed in the storage unit 1008, and loaded from the storage unit 1008 to the RAM 1003. The RAM 1003 also stores data or the like required for executing various types of processes using the CPU 1001 as necessary.

According to the computer configured as described above, the CPU 1001 performs the series of processes described above by executing a program stored in the storage unit 1008, and loaded to the RAM 1003 via the input/output interface 1005 and the bus 1004, for example.

For example, the program executed by the computer (CPU 1001) may be recorded in the removable storage medium 1011 such as a package medium, and provided in this form. Moreover, the program can be provided via a wired or wireless transfer medium, such as a local area network, the Internet, and digital satellite broadcasting.

The program of the computer can be installed into the storage unit 1008 via the input/output interface 1005 from the removable storage medium 1011 attached to the drive 1010. Alternatively, the program can be received by the communication unit 1009 via a wired or wireless transfer medium, and installed in the storage unit 1008. In addition, the program can be installed beforehand in the ROM 1002 or the storage unit 1008.

Note that the program executed by the computer may be a program where processes are performed in time series in the order described in the present specification, or may be a program where processes are performed in parallel or at necessary timing such as an occasion when a call is made.

Note that the CPU 1001 in FIG. 23 achieves the function of the processor 71 in FIG. 3.

In addition, a system in the present description refers to a set of multiple constituent elements (devices, modules (parts) or the like). A set of constituent elements are regarded as a system regardless of whether or not all of the constituent elements are contained in an identical housing. Accordingly, multiple devices accommodated in different housings and connected to each other via a network, and one device which contains multiple modules in one housing are both regarded as a system.

Note that modes for carrying out the present disclosure are not limited to the embodiment described above, and can be modified in various manners without departing from the scope of the present disclosure.

For example, the present disclosure can have a configuration of cloud computing where one function is shared and processed by multiple devices operating in cooperation with each other via a network.

Moreover, the respective steps described in the above flowcharts can be executed by one device, or can be shared and executed by multiple devices.

Furthermore, in a case where multiple processes are included in one step, the plurality of processes included in the one step can be executed by one device, or can be shared and executed by multiple devices.

Note that the present disclosure can also have the following configurations.

<1>

An information processing device including:
a trigger acquisition unit that acquires a trigger; and
a management unit that manages an applet in a secure element on the basis of the trigger.

<2>

The information processing device according to <1>, in which the trigger contains position information, time information, elapsed-time information, and operation information.

<3>

The information processing device according to <1> or <2>, in which the management unit installs the applet in the secure element on the basis of the trigger.

<4>

The information processing device according to <3>, in which the management unit registers, as a deletion trigger rule, a trigger that is a deletion condition for deleting the installed applet at a time of installation of the applet in the secure element.

<5>

The information processing device according to <4>, in which the management unit deletes the installed applet in a case where the trigger is a trigger registered as the deletion trigger rule.

<6>

The information processing device according to <5>, in which the applet includes an electronic ticket, an administration ID, and a transportation electronic pass.

<7>

The information processing device according to <6>, in which,
in a case where the applet is the electronic ticket, a trigger indicating a predetermined time and date is registered in the deletion trigger rule as a trigger corresponding to the deletion condition after the electronic ticket is used, and,
when the trigger acquisition unit acquires time information indicating the predetermined time and date as the trigger, the management unit recognizes the trigger as the trigger registered as the deletion trigger rule, and deletes the installed applet as the electronic ticket.

<8>

The information processing device according to <6>, in which,
in a case where the applet is an administration ID, a trigger that is an elapse of a predetermined time from installation of the applet as the administration ID is the deletion condition of the deletion trigger rule, and,
when the trigger acquisition unit acquires the trigger that is the elapse of the predetermined time from installation of the applet as the administration ID, the management unit recognizes the trigger as the trigger registered as the deletion trigger rule, and deletes the installed applet as the administration ID.

<9>

The information processing device according to <6>, in which,
in a case where the applet is a transportation electronic pass within a predetermined country, a trigger that a current position is not located within the predetermined country is the deletion condition of the deletion trigger rule, and, when the trigger acquisition unit acquires the trigger constituted by position information indicating that the current position is not located within the predetermined country, the management unit recognizes the trigger as the trigger registered as the deletion trigger rule, and deletes the installed applet as the transportation electronic pass.

<10>
The information processing device according to <5>, in which the management unit manages a log of the installed applet, and deletes a part of the log together with the installed applet at a time of deletion of the installed applet.

<11>
The information processing device according to <10>, in which a type of information associated with the log as a not deleted part of the log other than the deleted part is registered in association with the applet as information included in the deletion trigger rule at the time of deletion of the installed applet.

<12>
The information processing device according to <11>, in which, when the management unit re-installs the same applet after deletion of the installed applet, the re-installed applet uses the log.

<13>
The information processing device according to <11>, in which the log contains a charge amount, a point, discount information, and information indicating a use history each generated by execution of the applet.

<14>
The information processing device according to <3>, in which the management unit stores, as an issue trigger rule, a trigger that is a condition for installing the applet in the secure element, and installs the applet in a case where the trigger corresponds to a trigger registered as the issue trigger rule.

<15>
An information processing method including
acquiring a trigger; and
managing an applet in a secure element on the basis of the trigger.

<16>
A program causing a computer to function as:
a trigger acquisition unit that acquires a trigger; and
a management unit that manages an applet in a secure element on the basis of the trigger.

<17>
An information processing system constituted by an information processing device and a wearable device that performs near field communication with the information processing device, in which
the information processing device includes a trigger acquisition unit that acquires a trigger, and
the wearable device includes a management unit that manages an applet in a secure element on the basis of the trigger.

<18>
The information processing system according to <17>, in which
the information processing device includes a trigger acquisition unit that acquires a trigger, and
the wearable device includes a management unit that manages an applet in the secure element on the basis of the trigger.

<19>
The information processing system according to <17>, in which the wearable device includes
the trigger acquisition unit that acquires a trigger, and
the management unit that manages an applet in the secure element on the basis of the trigger.

<20>
The information processing system according to <17>, in which the wearable device is a smartwatch or a wristband.

REFERENCE SIGNS LIST

11: Information processing system
31, 31-1 to 31-*n*, 31A to 31C: Electronic apparatus
32, 32A to 32C: Server
33, 33-1 to 33-*n*, 33A to 33C: R/W
34, 34-1 to 34-*n*: Management device
51: Control unit
52: Input unit
53: Output unit
54: Storage unit
55: Communication unit
58: Secure element
61: Host program
71: Processor
73: ROM
74: RAM
75: EEPROM
91: Management applet
101: Control unit
111: Applet issue processing unit
131, 131A to 131C: External trigger device
151, 151A to 151C: Trigger acquisition unit
152, 152A to 152C: Internal trigger detection unit
171, 171A to 171C: Trigger rule
172, 172A to 172C: Log
181, 181A to 181C: Applet
231: Host program
241: Trigger acquisition unit
242: Internal trigger detection unit
271: Trigger rule
272: Log
281: Applet

The invention claimed is:

1. An information processing device, comprising:
circuitry configured to:
acquire a first trigger;
install an applet in a secure element based on the first trigger; and
register a specific trigger at a time of the installation of the applet in the secure element, wherein
the specific trigger is registered as a deletion trigger rule that is a deletion condition to delete the installed applet.

2. The information processing device according to claim 1, wherein the first trigger contains position information, time information, elapsed-time information, and operation information.

3. The information processing device according to claim 1, wherein the circuitry is configured to delete the installed applet based on the specific trigger registered as the deletion trigger rule.

4. The information processing device according to claim 3, wherein the applet includes one of an electronic ticket, an administration ID, or a transportation electronic pass.

5. The information processing device according to claim 4, wherein,
the applet is the electronic ticket,
the specific trigger indicates a specific time and date,
the specific trigger corresponds to the deletion condition after the electronic ticket is used,
the acquired first trigger is time information indicating the specific time and date, and
the circuitry is further configured to:
recognize the acquired first trigger as the specific trigger registered as the deletion trigger rule; and
delete the installed applet as the electronic ticket.

6. The information processing device according to claim 4, wherein,
the applet is the administration ID,
the specific trigger is an elapse of a specific time from the installation of the applet as the administration ID, and
the acquired first trigger is the elapse of the specific time from the installation of the applet as the administration ID,
the circuitry is further configured to:
recognize the acquired first trigger as the specific trigger registered as the deletion trigger rule; and
delete the installed applet as the administration ID.

7. The information processing device according to claim 4, wherein,
the applet is the transportation electronic pass within a specific country,
the specific trigger is that a current position is not located within the specific country, and
the acquired first trigger indicates that the current position is not located within the specific country,
the circuitry is further configured to:
recognize the acquired first trigger as the specific trigger registered as the deletion trigger rule; and
delete the installed applet as the transportation electronic pass.

8. The information processing device according to claim 3, wherein
the circuitry is further configured to:
manage a log of the installed applet; and
delete a part of the log together with the installed applet at a time of deletion of the installed applet.

9. The information processing device according to claim 8, wherein
a type of information, associated with a not deleted part of the log other than the deleted part of the log, is registered in association with the applet as information included in the deletion trigger rule at the time of deletion of the installed applet.

10. The information processing device according to claim 9, wherein,
the circuitry is further configured to re-install the applet after the deletion of the installed applet, and
the re-installed applet uses the log.

11. The information processing device according to claim 9, wherein
the log contains a charge amount, a point, discount information, and information indicating a use history, and
each of the charge amount, the point, the discount information, and the information indicating the use history is generated by execution of the applet.

12. The information processing device according to claim 1, wherein the circuitry is further configured to:
store an issue trigger rule as a second trigger; and
install the applet based on the acquired first trigger corresponds to second trigger stored as the issue trigger rule.

13. An information processing method performed by an information processing device, comprising:
acquiring a trigger;
installing an applet in a secure element based on the trigger; and
registering a specific trigger at a time of the installation of the applet in the secure element, wherein
the specific trigger is registered as a deletion trigger rule that is a deletion condition to delete the installed applet.

14. A non-transitory computer-readable medium having stored thereon, computer-executable instructions which, when executed by an information processing device, cause the information processing device to execute operations, the operations comprising:
acquiring a trigger;
installing an applet in a secure element based the trigger; and
registering a specific trigger at a time of the installation of the applet in the secure element, wherein
the specific trigger is registered as a deletion trigger rule that is a deletion condition to delete the installed applet.

15. An information processing system, comprising:
first circuitry configured to acquire a trigger; and
second circuitry configured to:
install an applet in a secure element based on the trigger; and
register a specific trigger at a time of the installation of the applet in the secure element, wherein
the specific trigger is registered as a deletion trigger rule that is a deletion condition to delete the installed applet.

16. The information processing system according to claim 15, wherein the information processing system comprises:
an information processing device comprising the first circuitry; and
a wearable device comprising the second circuitry, wherein the wearable device is configured to perform near field communication with the information processing device.

17. The information processing system according to claim 15, wherein the information processing system comprises:
a wearable device comprising:
the first circuitry; and
the second circuitry.

18. The information processing system according to claim 17, wherein the wearable device is one of a smartwatch or a wristband.

* * * * *